US010389632B1

United States Patent
O'Brien et al.

(10) Patent No.: US 10,389,632 B1
(45) Date of Patent: *Aug. 20, 2019

(54) NON-RECIRCULATING LABEL SWITCHING PACKET PROCESSING

(71) Applicant: Amazon Technologies, Inc., Seattle, WA (US)

(72) Inventors: Kari Ann O'Brien, Austin, TX (US); Thomas A. Volpe, Austin, TX (US); Bijendra Singh, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,508

(22) Filed: Jul. 13, 2018

Related U.S. Application Data

(63) Continuation of application No. 15/085,823, filed on Mar. 30, 2016, now Pat. No. 10,027,587.

(51) Int. Cl.
*H04L 12/28* (2006.01)
*H04L 12/741* (2013.01)
(Continued)

(52) U.S. Cl.
CPC ............ *H04L 45/745* (2013.01); *H04L 45/50* (2013.01); *H04L 49/109* (2013.01); *H04L 69/22* (2013.01); *H04L 69/325* (2013.01)

(58) Field of Classification Search
CPC ........... H04L 29/06095; H04L 29/0653; H04L 45/74; H04L 49/3009; H04L 49/309;
(Continued)

(56) References Cited

U.S. PATENT DOCUMENTS

| 8,649,384 B1* | 2/2014 | Zhou | H04L 45/00 370/400 |
| 9,660,914 B1* | 5/2017 | Zhou | H04L 47/11 |

(Continued)

OTHER PUBLICATIONS

U.S. Appl. No. 15/085,823, "Non Final Office Action," dated Nov. 22, 2017, 10 pages.

(Continued)

*Primary Examiner* — Robert J Lopata
(74) *Attorney, Agent, or Firm* — Kilpatrick Townsend & Stockton LLP

(57) ABSTRACT

Disclosed herein is an apparatus for processing an Internet Protocol (IP) header and label switching (LS) headers of a packet in a pipeline. The apparatus includes an LS header processing circuit configured to select a first operation for the packet using an LS header from the packet, and an IP header processing circuit configured to perform an IP lookup to select a second operation for the packet. The apparatus further includes a tunnel initiation circuit configured to initiate an LS tunnel or IP tunnel. The LS header processing circuit, the IP header processing circuit, and the tunnel initiation circuit are operable to operate sequentially on a same packet and concurrently on different packets in a pipeline. Each of these circuits is operable to be bypassed based on an outermost header in the packet, or the selected one of the first operation or the second operation.

20 Claims, 16 Drawing Sheets

(51) Int. Cl.
*H04L 12/933* (2013.01)
*H04L 29/08* (2006.01)
*H04L 29/06* (2006.01)
*H04L 12/723* (2013.01)

(58) Field of Classification Search
CPC ....... H04L 45/745; H04L 45/50; H04L 69/22; H04L 69/325; H04L 49/109
USPC .......................................................... 370/392
See application file for complete search history.

(56) References Cited

U.S. PATENT DOCUMENTS

| | | | | |
|---|---|---|---|---|
| 2004/0114595 A1* | 6/2004 | Doukai | .................. | H04L 45/00 370/389 |
| 2005/0165952 A1* | 7/2005 | Anschutz | ................ | H04L 45/00 709/238 |
| 2008/0159301 A1* | 7/2008 | de Heer | ............... | H04L 12/4633 370/401 |
| 2008/0186852 A1* | 8/2008 | Sami | ........................ | H04L 45/00 370/235 |
| 2009/0292943 A1* | 11/2009 | Hanif | ...................... | H04L 45/00 714/4.1 |
| 2010/0158010 A1* | 6/2010 | Kang | ....................... | H04L 45/00 370/392 |
| 2013/0077630 A1* | 3/2013 | Bejerano | ................. | H04L 45/50 370/392 |
| 2013/0188634 A1* | 7/2013 | Magee | ................... | H04L 12/462 370/389 |
| 2014/0185607 A1* | 7/2014 | Mashimo | ................. | H04L 45/10 370/351 |
| 2014/0219277 A1* | 8/2014 | Bosshart | ................. | H04L 45/74 370/392 |
| 2014/0236873 A1* | 8/2014 | Viljoen | .................. | H04L 49/602 706/12 |
| 2014/0269716 A1* | 9/2014 | Pruss | ...................... | H04L 45/38 370/392 |
| 2015/0215198 A1* | 7/2015 | Wijnands | ............... | H04L 45/245 370/392 |
| 2017/0111275 A1* | 4/2017 | Li | .............................. | G06F 9/38 |
| 2017/0289032 A1* | 10/2017 | Guichard | .............. | H04L 45/306 |

OTHER PUBLICATIONS

U.S. Appl. No. 15/085,823, "Notice of Allowance," dated Mar. 27, 2018, 8 pages.

* cited by examiner

US 10,389,632 B1

NON-RECIRCULATING LABEL SWITCHING PACKET PROCESSING

CROSS REFERENCE TO RELATED APPLICATIONS

This application is a continuation of U.S. Non-Provisional patent application Ser. No. 15/085,823, filed Mar. 30, 2016, issued to U.S. Pat. No. 10,027,587 on Jul. 17, 2018, and entitled "NON-RECIRCULATING LABEL SWITCHING PACKET PROCESSING," the content of which is herein incorporated by reference in its entirety.

BACKGROUND

Label switching (LS) is a data-carrying service for high-performance telecommunications networks. In LS, data is directed from one network node to the next one based on short path labels rather than Internet Protocol (IP) addresses. LS packets, such as multiprotocol label switching (MPLS) packets, can encapsulate packets of various network protocols by tagging the packets with identifiers called labels, and can support a range of access technologies, including T1/E1, Asynchronous Transfer Mode (ATM), Frame Relay, and Digital Subscriber Line (DSL). An LS packet may have multiple labels arranged in a stack on top of a Layer 3 (L3) header, such as an IP header.

BRIEF DESCRIPTION OF THE DRAWINGS

Various embodiments in accordance with the present disclosure will be described with reference to the drawings, in which.

DETAILED DESCRIPTION

Figure 12:
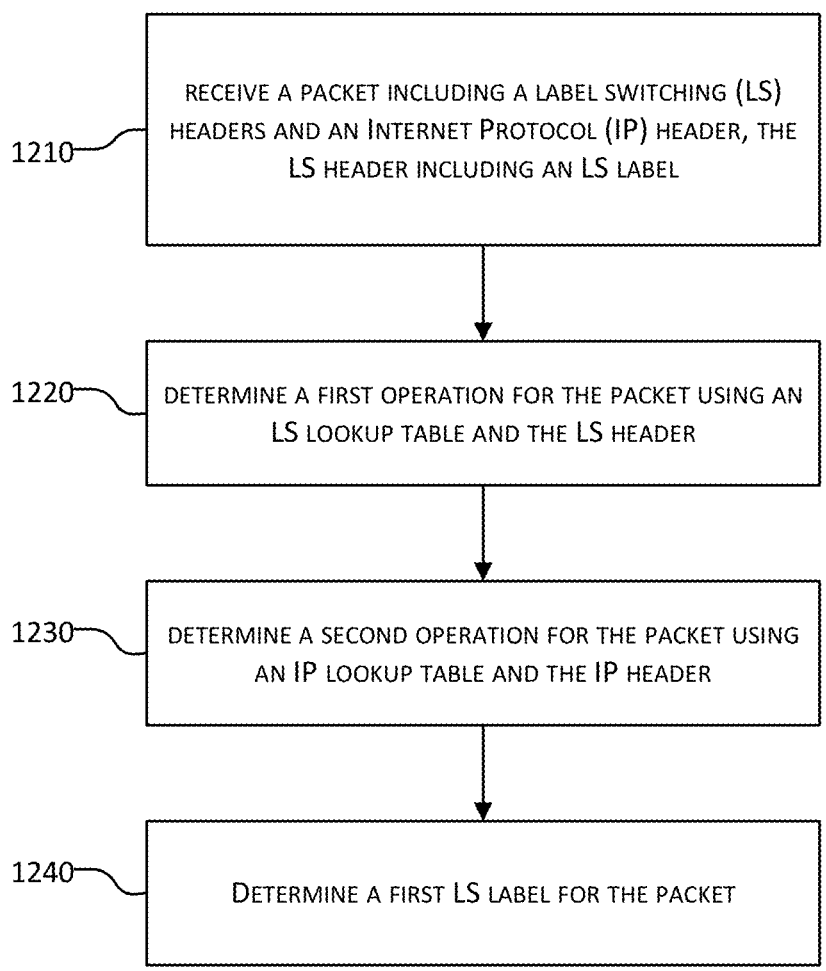
FIG. 12 is a flow chart illustrating an example pipelined process, according to some embodiments.
Figure 13:
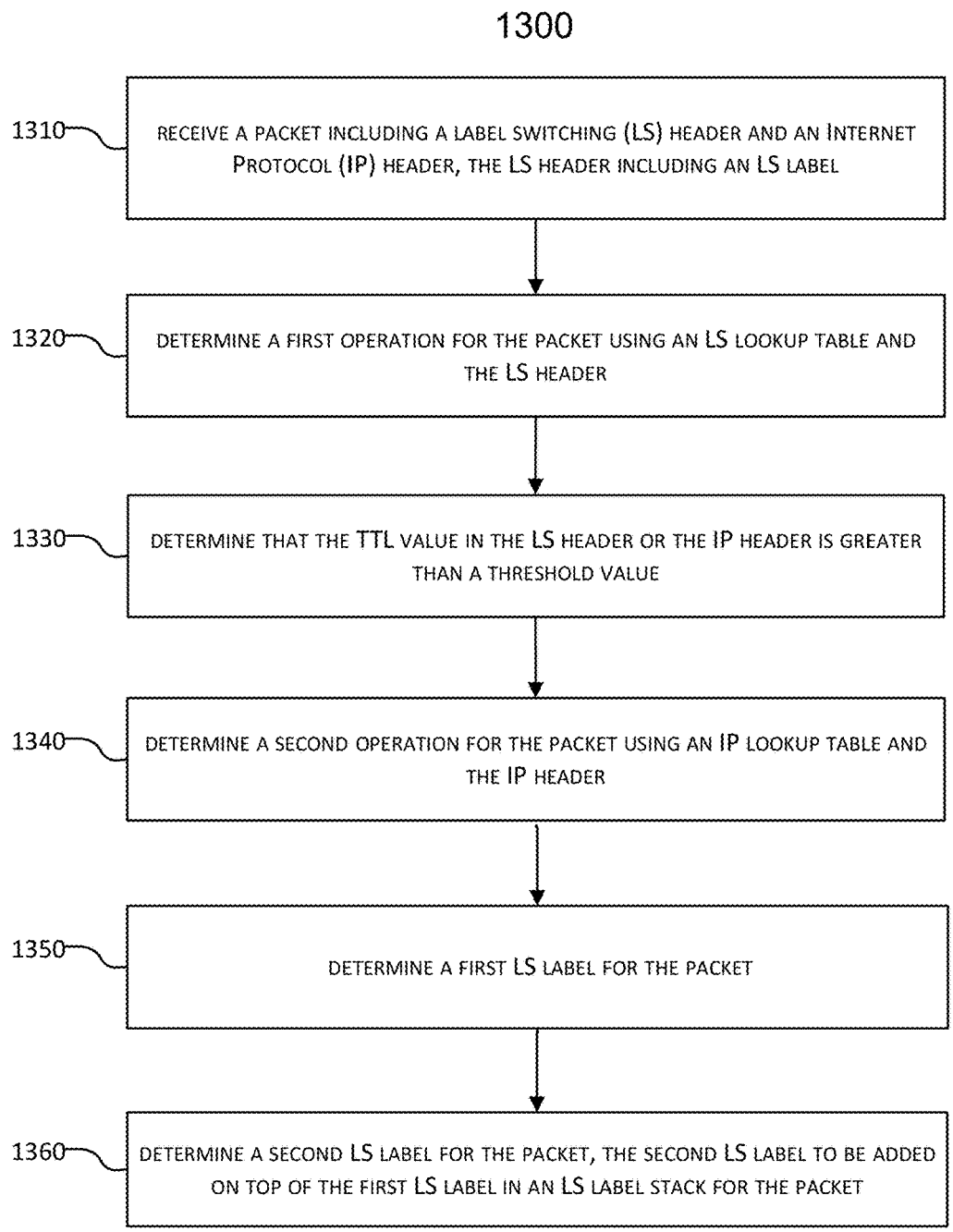
FIG. 13 is a flow chart illustrating an example pipelined process, according to some embodiments.
Figure 14:
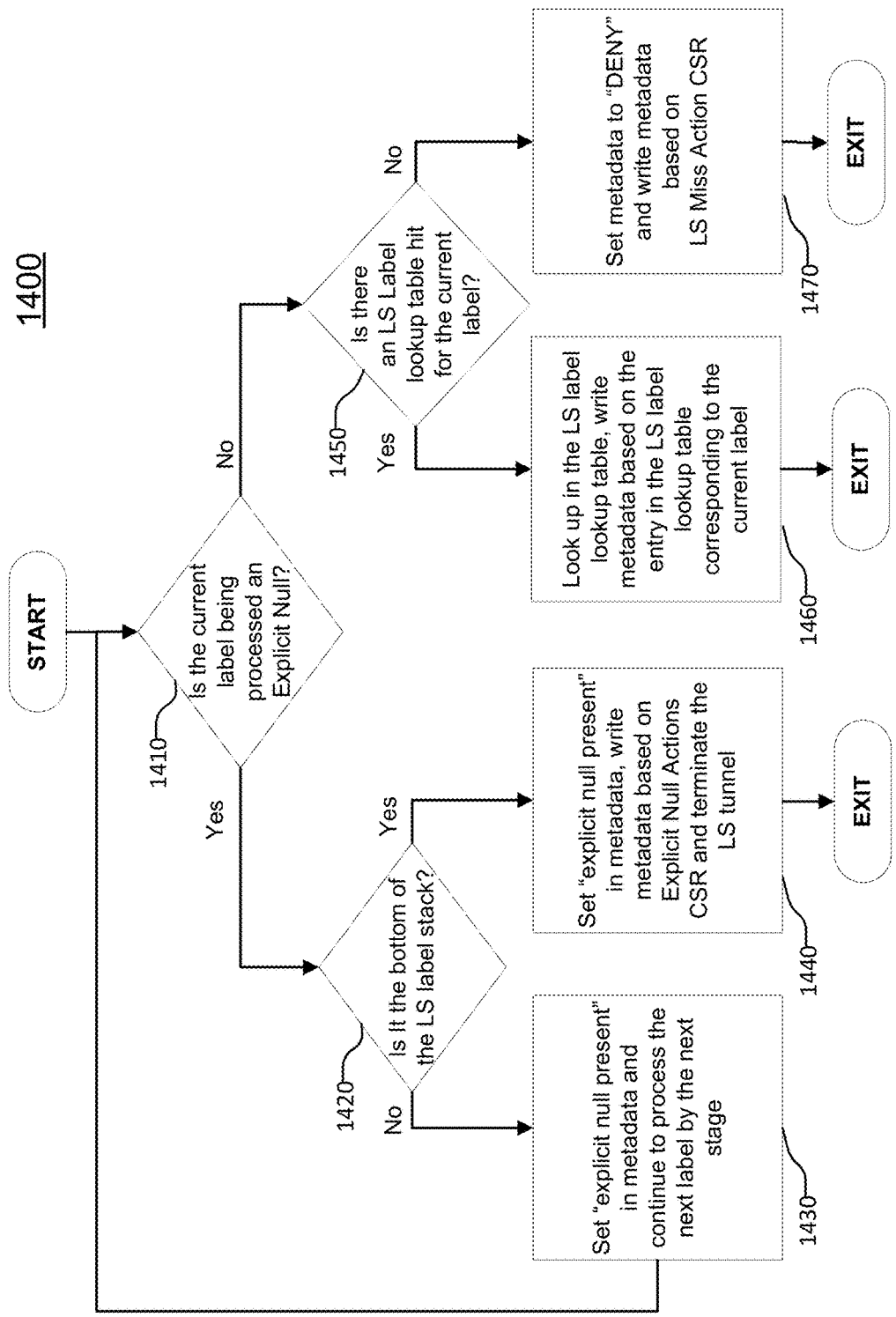
FIG. 14 is a flow chart illustrating an exemplary embodiment of an LS label processing flow.

In the following description, various embodiments will be described. For purposes of explanation, specific configurations and details are set forth in order to provide a thorough understanding of the embodiments. In particular, FIGS. 1 and 2 and their corresponding description provide an introduction to multiprotocol label switching (MPLS) data transport through one or more MPLS domains in an MPLS network. FIG. 3 and the corresponding description describe applications of MPLS in virtual private networks (VPNs). FIGS. 4-11 and their corresponding description describe various embodiments of a hardware pipeline for non-recirculating label switching (LS) headers and Layer 3 (L3) headers processing. FIGS. 12-14 and their corresponding description describe various non-recirculating LS label processing flows. However, it will also be apparent to one skilled in the art that the embodiments may be practiced without the specific details. Furthermore, well-known features may be omitted or simplified in order not to obscure the embodiment being described.

In the following description, MPLS data transport and Internet Protocol (IP) are used as examples to illustrate the disclosed techniques. It is apparent to one skilled in the art that the disclosed techniques may also be used in other label switching data transports or variations to the MPLS data transport, and other L3 protocols.

As used herein, a circuit may include one or more integrated circuits (ICs), such as processors, application specific integrated circuits (ASICs), field programmable gate arrays (FPGA), systems-on-chip (SoCs), systems-in-package (SiPs), or a portion of an ASIC, FPGA, SoC, or SiP.

Techniques described herein relate to a hardware pipeline for LS packets processing. In LS data transport, an LS packet may include a number of layers of encapsulations of an L3 packet, such as an IP packet. In many instances, multiple layers of encapsulations may need to be processed before an appropriate routing decision can be made. This is generally done by recirculating the packet (or its headers) through a same processing circuit for each layer to be processed. This recirculation may significantly increase latency and reduce throughput. The disclosed techniques eliminate recirculations when processing multiple layers of encapsulations in a packet before routing the packet to a different device, by providing a hardware pipeline with circuits that can process multiple headers of the packet sequentially and process headers of different packets concurrently.

More specifically, the disclosed techniques allow L3 headers, such as IP headers, and LS headers, such as MPLS headers, in a packet to be processed in a single hardware pipeline without recirculating the headers through any router or table. The hardware pipeline may include an IP header processing circuit integrated with an LS header processing circuit and a tunnel initiation circuit. The hardware pipeline can perform functions such as IP lookup, LS label lookup, LS tunnel initiation through IP lookup, LS label swap, LS tunnel termination followed by IP lookup, and LS tunnel termination followed by new LS tunnel initiation through IP lookup. In various embodiments, the hardware pipeline may include two or more LS header processing circuits, two or more IP header processing circuits, or two or more tunnel initiation circuits. The hardware pipeline may also support virtual routing and forwarding identifiers (VRFIDs) in the LS label lookup for use in the IP lookup. The hardware pipeline may be implemented on a single integrated circuit, device, or router.

I. MPLS and MPLS VPN

Traditional IP networks are connectionless: when a packet is received, a router determines the next hop using the destination IP address in the packet and information from its own forwarding table. The router's forwarding table may include information regarding the network topology obtained via an IP routing protocol, which keeps the information regarding the network topology synchronized with changes in the network.

MPLS is a scalable, protocol-independent transport. MPLS networks are IP-compatible and can be easily integrated with traditional IP networks. In an MPLS network, data packets are assigned labels. Packet-forwarding decisions are made using the labels, without the need to examine the packet itself. MPLS data transport operates at a layer that is generally considered to be between traditional definitions of Open Systems Interconnection (OSI) Layer 2 (L2, data link layer) and Layer 3 (L3, network layer), and thus is often referred to as a Layer 2.5 protocol. MPLS data transport is designed to provide a unified data-carrying service for both circuit-based clients and packet-switching clients. MPLS can be used to carry many different kinds of traffic, including IP packets, native Asynchronous Transfer Mode (ATM), Frame Relay, Synchronous Optical Networking (SONET), and Ethernet frames.

MPLS works by encapsulating an L3 packet with an MPLS header on top of an L3 header, such as an IP header. One or more MPLS headers each including an MPLS label can be added to an L3 packet. The MPLS labels in the one or more MPLS headers may form an MPLS label stack. Each MPLS header includes four fields: (1) a 20-bit MPLS label value; (2) a 3-bit Traffic Class (TC) field for quality of service (QoS) priority and explicit congestion notification (ECN); (3) a 1-bit bottom of stack flag, which, when set, signifies that the current label is the last in the stack and that the L3 header begins next; and (4) an 8-bit Time-to-Live (TTL) field. Each MPLS router decrements the value in the TTL field and discards a packet when the value of the TTL field initially set by an ingress router reaches zero or is below a threshold value, to prevent indefinite loop of a packet.

The MPLS-labeled packets are switched using a label lookup and switch instead of a lookup into an IP lookup table. Label lookup and label switching can be faster than an IP routing or routing information base (RIB) lookup, and may take place within the switching fabric rather than a CPU.

MPLS flows are connection-oriented and MPLS packets are routed along pre-configured virtual circuits called label switched paths (LSPs). An LSP is a path through an MPLS network, set up by a signaling protocol such as label distribution protocol (LDP), resource reservation protocol with traffic engineering extensions (RSVP-TE), border gateway protocol (BGP), or constraint-based routed LDP (CR-LDP). Label switched paths are established for a variety of purposes, such as to create network-based IP virtual private networks or to route traffic along specified paths through the network. In many respects, LSPs are not different from permanent virtual circuits (PVCs) in ATM or Frame Relay networks, except that they are not dependent on a particular Layer 2 technology. Because the forwarding of packets through an LSP is opaque to higher network layers, an LSP is also referred to as an MPLS tunnel. LSPs are unidirectional; they allow a packet to be label-switched through a MPLS network from one endpoint to another. For bidirectional communication, an LSP in the opposite direction needs to be set up. An LSP may include a plurality of MPLS routers.

Figure 1:
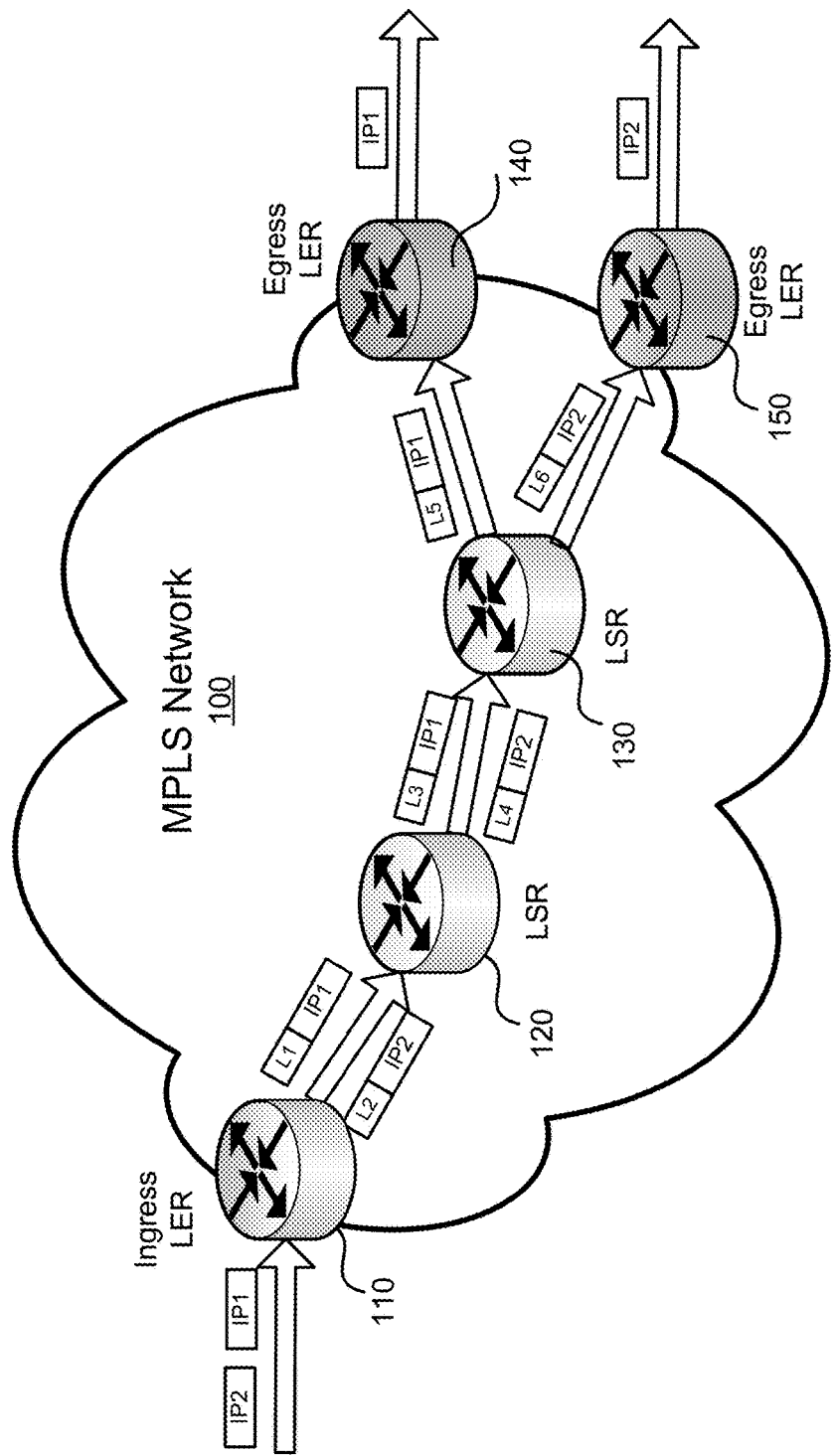
FIG. 1 is an example diagram of forwarding IP packets using MPLS label switched paths (LSPs) through an MPLS network.

FIG. 1 is an example diagram of forwarding IP packets using MPLS LSPs through an MPLS network 100. An LSP begins at an ingress label edge router (LER), for example, ingress LER 110, which makes a decision on which label to prefix to an L3 packet, such as an IP packet. An ingress LER uses routing information to determine an appropriate label to be affixed to the packet, labels the packet accordingly, and forwards the labeled packet into the MPLS network. For example, when an unlabeled packet arrives at ingress LER 110 of MPLS network 100, the source and destination IP addresses of the packet are analyzed and the packet is classified in a forwarding equivalence class (FEC). All packets within a same FEC may use the same LSP. If an LSP or virtual circuit has already been established for the FEC that the packet belongs to, ingress LER 110 inserts or pushes an MPLS header on the packet.

For example, in FIG. 1, ingress LER 110 receives two IP packets IP1 and IP2, and initiates one LSP for each of the two packets as they are not within the same FEC. Ingress LER 110 adds an MPLS header including an MPLS label L1 to IP packet IP1 and an MPLS header including an MPLS label L2 to IP packet IP2 to form MPLS packets. Ingress LER 110 then forwards each packet affixed with the MPLS label to a next router in the LSP for routing.

An ingress LER may affix a new MPLS label to an MPLS packet when the MPLS packet crosses multiple MPLS network domains. Thus, a packet may include one or more MPLS labels forming an MPLS label stack.

An MPLS router that receives an MPLS packet and performs the routing based on the label is called a label switch router (LSR) or transit router. This is a type of router located in the middle of an MPLS network, such as LSRs 120 and 130 in FIG. 1. An LSR is responsible for swapping the labels used for routing the packet.

MPLS LSRs do not require IP routing information. LSRs may have pre-built MPLS label lookup tables that tell them the operation to perform based on the outermost MPLS label of the incoming packet so that they can process the packet quickly. When a labeled packet is received by an LSR, such as LSRs 120 and 130, the outermost MPLS label in the MPLS label stack is examined. Based on the content of the outermost MPLS label, a SWAP, PUSH or POP operation may be performed on the packet's MPLS label stack. The LSR may use the outermost MPLS label as an index to determine the next hop on the label switched path and a corresponding label for the packet from an MPLS label lookup table.

In a SWAP operation, the outermost MPLS label is swapped with a new MPLS label, and the packet is forwarded to a next LSR along the path associated with the new MPLS label. For example, in FIG. 1, LSR 120 performs SWAP operations by replacing L1 with L3 for IP packet IP1, and replacing L2 with L4 for IP packet IP2. Similarly, LSR 130 performs SWAP operations by replacing L3 with L5 for IP packet IP1, and replacing L4 with L6 for IP packet IP2.

If an LSR determines that a PUSH operation is to be performed, a new label is pushed on top of the existing labels, effectively encapsulating the packet in another layer of MPLS. This allows hierarchical routing of MPLS packets. If an LSR determines that a POP operation is to be performed, the outermost label is removed from the packet, which may reveal an inner label below. This process is also referred to as decapsulation. If the popped label is the last in the MPLS label stack, the packet leaves the MPLS tunnel.

During these operations, the content of the packet below the MPLS label stack is not examined. Transit routers (LSRs) typically only need to examine the outermost MPLS label in the MPLS label stack. The forwarding of the packet is done based on the content of the outermost label, which allows protocol-independent packet forwarding that does not need to look at a protocol-dependent routing table and can avoid a more complicated IP longest prefix match (LPM) at each router.

The last router in an LSP is an egress LER, such as egress LERs 140 and 150 in FIG. 1. An egress LER may remove the MPLS header from the packet and forward the packet based on the header in the next layer. For example, egress LER 140 receives the MPLS packet with label L5 from LSR 130 and removes label L5. Egress LER 150 receives the MPLS packet with label L6 from LSR 130 and removes label L6. When the last label in the MPLS label stack is removed, only the payload remains, which may be an IP packet, or any of a number of other types of payload packets. The egress LER may forward the resulting IP packet using normal IP forwarding techniques.

When an MPLS label of Explicit Null ("0") is encountered by an LSR or LER, the LSR or LER may need to process the packet in two passes: one for popping the label, and the other one for routing the packet based on the underlying information, such as an IP header or a next MPLS label.

In an LSP, a different label is used for each hop. The label can be chosen by the router or switch performing the forwarding operation. This allows the use of fast and simple forwarding engines, which are often implemented in hardware. LSRs in an MPLS network regularly exchange label and reachability information with each other using standardized procedures in order to build a complete picture of the network to forward packets.

MPLS works in conjunction with Internet Protocol and its routing protocols, such as the interior gateway protocol (IGP). MPLS LSPs provide dynamic, transparent virtual networks and are capable of transporting a variety of transport payloads (IPv4, IPv6, ATM, Frame Relay, etc.), with support for traffic engineering, the ability to transport Layer 3 virtual private networks with overlapping address spaces, and support for Layer 2 pseudowires using pseudowire emulation edge-to-edge (PWE3). MPLS can also be used to carry various content (not only packets) over various link technologies using different label encoding for each Layer 2 link type.

As described above, it is possible for a packet to have multiple MPLS labels, which can be arranged in an MPLS label stack. This is referred to as label stacking, which involves the encapsulation of an MPLS packet inside another MPLS packet, that is, adding an MPLS header on top of (hence stacking) an existing MPLS header. The stacking allows one MPLS LSP to tunnel inside another LSP. Thus, MPLS allows hierarchical domain nesting. When a packet enters an MPLS domain that is contained within another MPLS domain, a new label is appended to the packet, which may already carry one or more MPLS labels. The MPLS labels may be processed in an order from the most recent label to the least recent label. The label that was pushed most recently will be used for forwarding until it is popped from the MPLS label stack.

Figure 2:
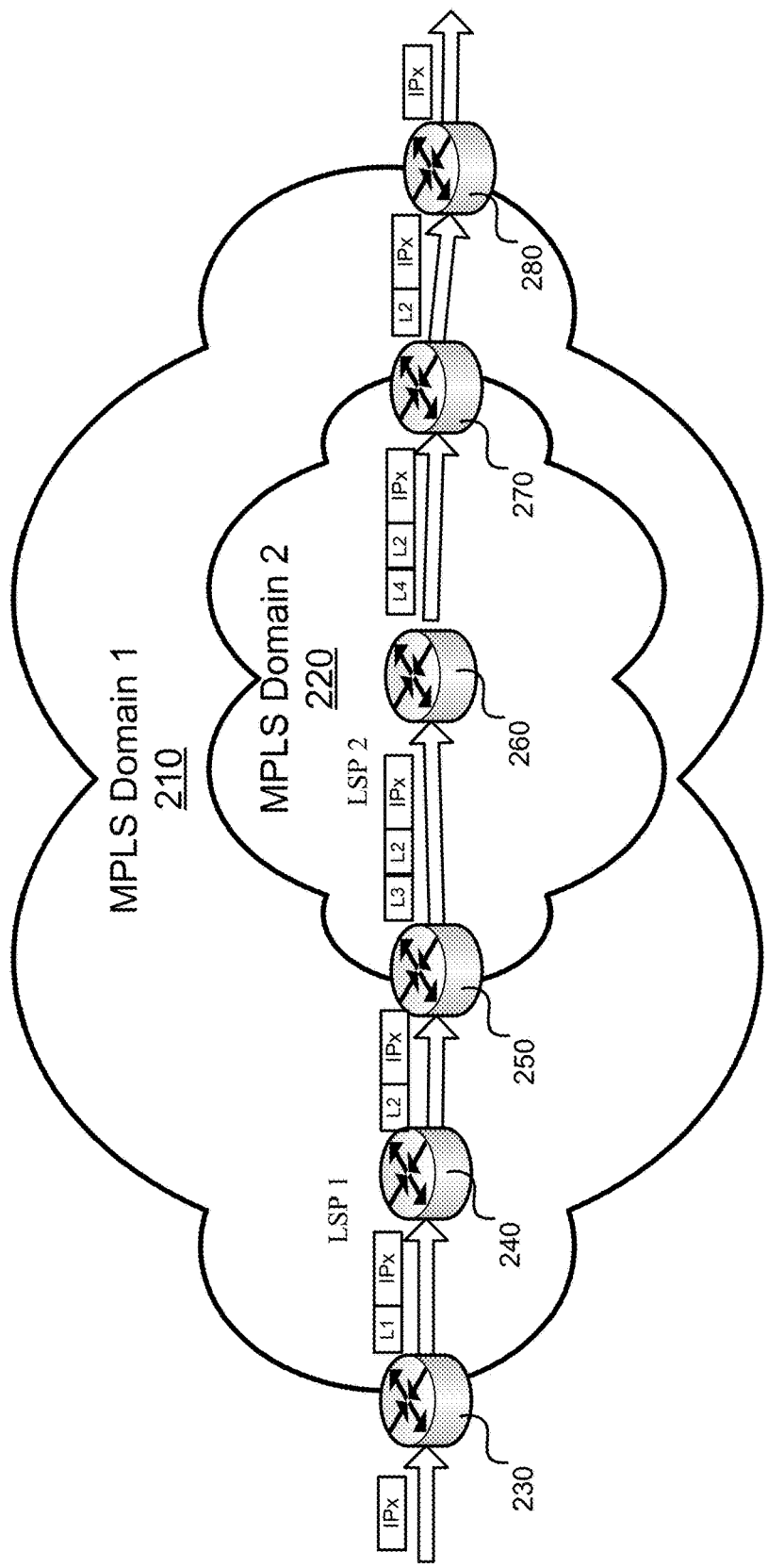
FIG. 2 illustrates an example of MPLS label stacking through two nested MPLS domains.
Figure 3:
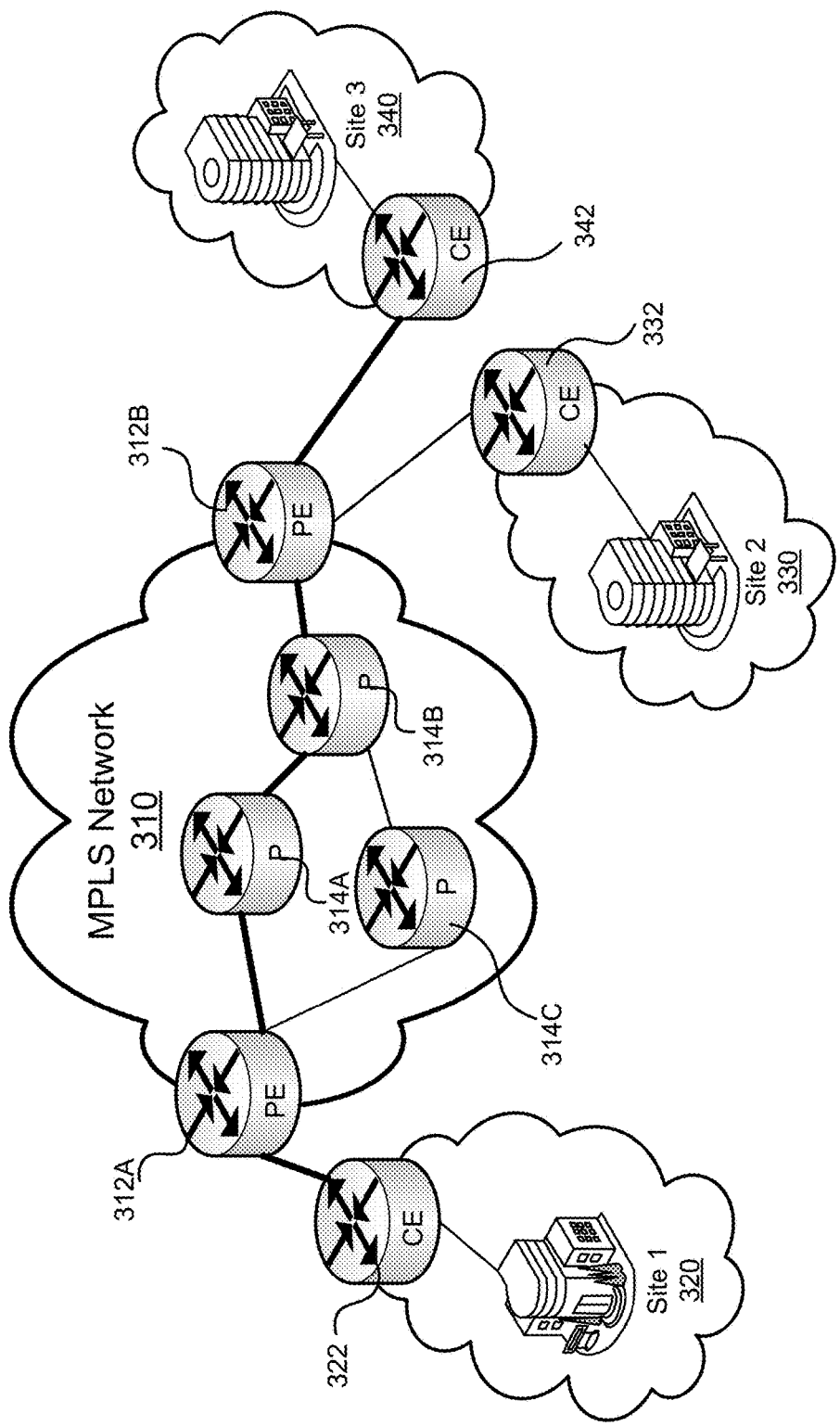
FIG. 3 illustrates an example of secure communication between different sites of an organization using MPLS virtual private networks (VPNs)

FIG. 2 illustrates an example of MPLS label stacking through two nested MPLS domains. As shown in FIG. 2, an IP packet IPx may enter a tunnel LSP 1 in MPLS domain 210 through an ingress LER 230, which may encapsulate IP packet IPx with an MPLS header by pushing an MPLS label L1 onto IP packet IPx. The MPLS packet with MPLS label L1 is forwarded to an LSR 240 by ingress LER 230. LSR 240 performs a SWAP operation on the MPLS packet by replacing MPLS label L1 with a new MPLS label L2, and forwards the MPLS packet with MPLS label L2 to an LSR 250, which may be an ingress LER of a tunnel LSP 2 inside tunnel LSP 1. LSR 250 may push a new MPLS label L3 onto the MPLS packet with MPLS label L2. As a result, the new MPLS packet has an MPLS label stack with an outer MPLS label L3 and an inner MPLS label L2. The new MPLS packet is forwarded to LSR 260 of LSP 2, which swaps outer MPLS label L3 with a new MPLS label L4. The MPLS packet with MPLS labels of L4 and L2 is forwarded to egress LER 270 of LSP 2. Egress LER 270 pops label L4, terminates tunnel LSP 2, and forwards the packet with MPLS label L2 to egress LER 280 of LSP 1. Egress LER 280 may remove MPLS label L2 in the packet and the packet exits LSP 1.

Note that across LSP 2, all operations are performed on the outermost label; the inner label L2 is not processed or changed until the outer label is removed and the packet exits LSP 2. In other words, the outermost labels are used to control the delivery of the packet within LSP 2. When the destination of LSP 2 is reached, the outermost MPLS label is removed (popped), and the inner label takes over to direct the packet further.

Label stacking can be used in VPN transport services, which may use an inner label to map traffic to specific interfaces, and an outer label to route packets within an MPLS network. VPNs have become increasingly important as more and more organizations are connecting to one or more service providers' network. Keeping data private as it travels across the service providers' network is important for both the service providers and the organizations sending the data. VPNs may use tunneling protocols to create secure connections. While deploying a single VPN service model would simplify network operations, it may not satisfy diverse customer requirements. To satisfy a broad range of customer requirements, service providers may offer a number of different VPN service delivery models using, for example, MPLS VPNs.

MPLS VPNs may be provided to an organization from a third party provider to create a secure connection between branch offices, shops, warehouses etc. This enables users to send emails, share files, perform domain authentication, make VOIP phone calls, operate point of sale equipment, etc., on one single private network for the entire organization, which may have multiple locations where some locations may use optical fiber, while others may use asymmetric digital subscriber line (ADSL) or wireless for data communication. MPLS VPNs can use various combinations of technologies, including Ethernet, broadband digital subscriber line (DSL), high-speed downlink packet access (HSDPA), and WiMax. MPLS VPNs may use label stacking to tunnel a customer's VPN traffic across an MPLS core.

In the context of an MPLS-based VPN, LERs that function as ingress or egress routers in an MPLS network are often referred to as provider edge (PE) routers. LSRs that function as transit routers are referred to as provider (P) routers. P routers may perform less functions than the PE routers. Therefore, P routers may be less complex and may be more dependable than PE routers. Customer edge (CE) and PE routers operate at the boundary of the customer network and service provider network, respectively.

FIG. 3 illustrates an example of secure communication between different sites of an organization using MPLS VPNs. For example, the organization may have a VPN including site 1 320, site 2 330 and site 3 340 connected through an MPLS network 310, which may be provided by one or more service providers.

Each site in the organization's VPN may include one or more CE routers, such as CE router 322 for site 1 320, CE router 332 for site 2 330, and CE router 342 for site 3 340. A CE router provides a customer access to a service provider network, such as MPLS network 310, over a data link to one or more PE routers, such as PE routers 312A and 312B. The CE router may be an IP router that establishes an adjacency with its directly connected PE routers. After the adjacency is established, the CE router advertises the site's local VPN routes to the PE routers and learns remote VPN routes from the PE routers. The CE router may also be an MPLS LSR or an MPLS LER, such as an egress LER.

Decisions regarding how to switch the traffic may be made at the originating PE router, for example, PE router 312A for a packet forwarded from CE router 322 of site 1 320. A PE router understands both the customer VPN locations and available LSPs across MPLS network 310. Therefore, a PE router may apply a pair of labels to a packet as the packet enters MPLS network 310 from customer sites. The inner label may be a VPN label, which allows the packet to be routed to a correct customer site at a destination PE router. The outer label may be an LSP label, which allows the packet to be switched across an LSP through MPLS network 310 using, for example, P routers 314A, 314B, and 314C.

As described above with respect to FIG. 2, an MPLS network may include a hierarchical nesting of different MPLS domains, and thus a packet in an LSP may travel through nested MPLS domains, and may include a stack of labels representing different MPLS domains in addition to the VPN label.

A P router may be any router in the provider's network that does not directly couple to CE routers. P routers function as MPLS transit LSRs when forwarding VPN data traffic between PE routers. P routers may only examine and modify the outermost MPLS label in an MPLS label stack. The inner labels of the MPLS label stack are generally not examined or changed by the P routers. Thus, P routers may only maintain routes to the provider's PE routers, and may not maintain specific VPN routing information for each customer site.

PE routers may exchange routing information with CE routers using, for example, static routing, routing information protocol (RIP) v2, open shortest path first (OSPF), or enhanced interior gateway routing protocol (EIGRP). While a PE router maintains VPN routing information, it may only need to maintain VPN routes for those VPNs to which it is directly connected.

A PE router may maintain a virtual routing and forwarding (VRF) table for each of its directly connected sites. Multiple sites connected to a PE router can be associated with a single VRF if these sites participate in the same VPN. Each VPN may be mapped to a specific VRF. A PE router is able to maintain multiple forwarding tables that support the per-VPN segregation of routing information. After learning local VPN routes from CE routers, a PE router may exchange VPN routing information with other PE routers using, for example, internal BGP (IBGP). Only routes pertinent to the PE router's VRFs are exchanged.

Virtual routing and forwarding can be included in IP network routers to allow multiple routing tables to exist in a router and work simultaneously. This allows network paths to be segmented without using multiple devices. Because data traffic is automatically segregated, VRF also increases network security and may eliminate the need for encryption and authentication. Internet service providers (ISPs) often use virtual routing and forwarding to create separate VPNs for customers; thus, VRF is also referred to as VPN routing and forwarding. VRF allows multiple IP routing domains to co-exist within a same device at the same time. Because the routing domains are independent, overlapping IP addresses can be used without causing conflicts. In large service provider networks, virtual routing and forwarding can be used in conjunction with MPLS to separate each customer's traffic into its own wide area VPN.

A VRF instance may only use a single routing table to determine how a packet is forwarded. The VRF routing table prevents traffic from being forwarded outside a specific VRF path and also keeps out traffic that should remain outside the VRF path.

II. Pipelined LS Processing

As discussed above, when an MPLS packet includes one or more MPLS labels on top of a Layer 3 header, such as an IP header, an MPLS router may need to process a packet more than one time. This is generally done by recirculating the packet (or the headers of the packet) through the MPLS router multiple times before an appropriate routing decision may be made, which may increase the latency and reduce the efficiency or throughput of the router.

A hardware pipeline for processing IP headers and LS headers in a packet in a pipeline without recirculating the headers through any router or table is disclosed herein. The hardware pipeline may include an IP packet processing circuit integrated with an LS header processing circuit, a tunnel initiation circuit, and an LS outer label determination circuit. As needed, in various embodiments, the hardware pipeline may include two or more LS header processing circuits, two or more IP header processing circuits, two or more tunnel initiation circuits, or two or more LS outer label determination circuits in the pipeline. The hardware pipeline can perform functions such as IP lookup, LS tunnel initiation through IP lookup, LS label lookup, LS tunnel switch, LS tunnel termination followed by IP lookup, and LS tunnel termination followed by new LS tunnel initiation through IP lookup. The hardware pipeline may also support VRFID in the LS label lookup for use in the IP lookup. For example, the disclosure techniques enable an LS tunnel to terminate and a VRFID from the LS tunnel to be applied to a subsequent IP lookup in the pipeline, without having to send the packet to a same router or packet processing circuit twice. The hardware pipeline can also process multiple LS headers in serial without having to send the LS headers to a same LS header processing circuit twice.

Figure 4:
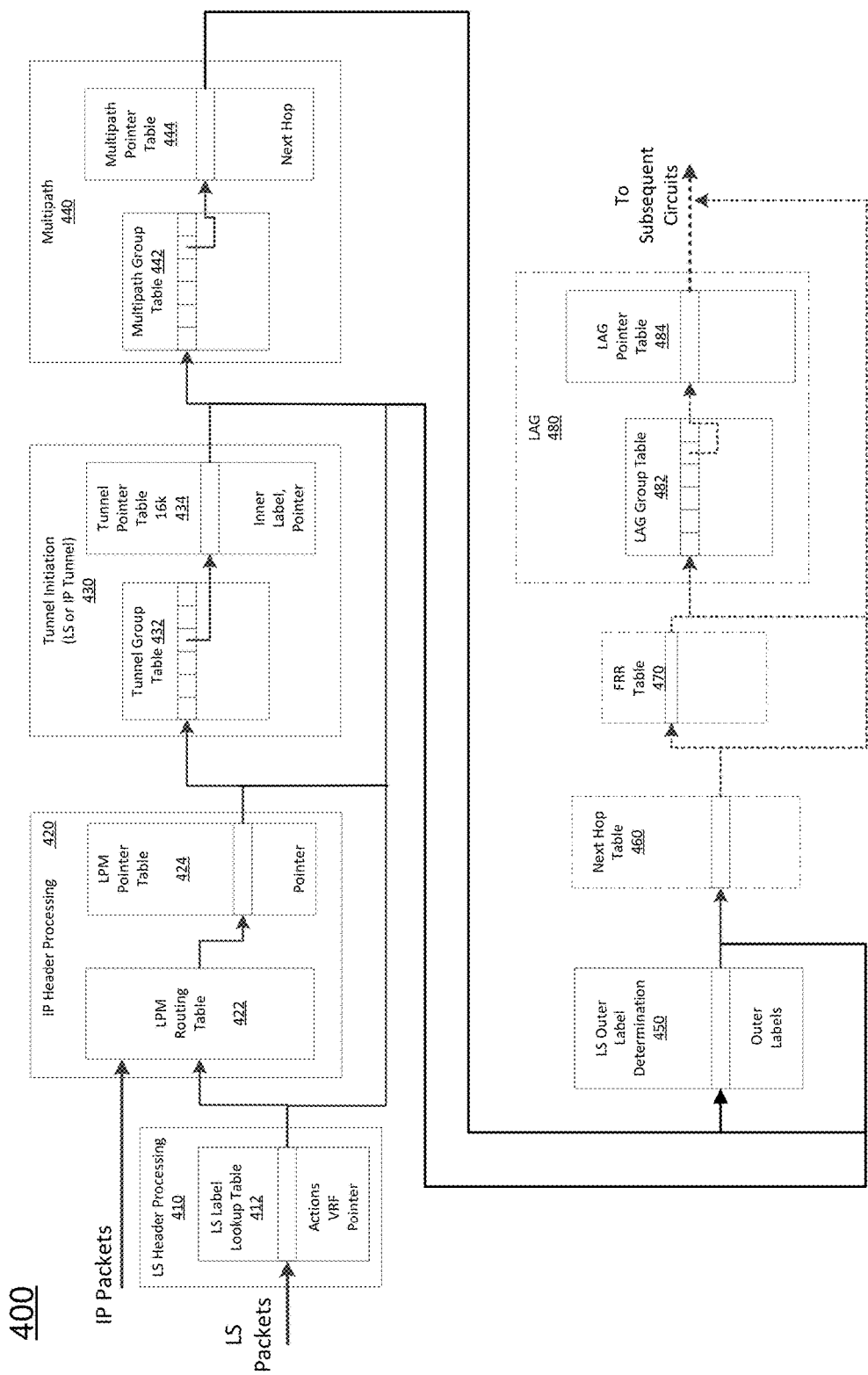
FIG. 4 is a block diagram of an example hardware pipeline for processing label switching (LS) and L3 packets.

FIG. 4 is a block diagram of an example hardware pipeline 400 for processing LS and L3 packets, such as MPLS packet and IP packets. Hardware pipeline 400 may include an LS header processing circuit 410, an IP header processing circuit 420, a tunnel initiation circuit 430, a multipath resolution circuit 440, and an LS outer label determination circuit 450. In some embodiments, hardware pipeline 400 may also include a next hop table lookup circuit 460, a fast re-route (FRR) table lookup circuit 470, and a link aggregation group (LAG) table lookup circuit 480.

LS header processing circuit 410 may include an LS label lookup table 412 that has, for example, 8 K entries, where each entry may include the corresponding action to be taken on a packet, a VRFID for the packet, and a pointer to, for example, an LS outer label table or a multipath table, such as a weighted cost multipath (WCMP) table or an equal cost multipath (ECMP) table, for a given LS label in the packet. LS header processing circuit 410 is described below in more details with respect to FIG. 7.

IP header processing circuit 420 may include an LPM routing table 422 and an LPM pointer table 424. Each entry in LPM routing table 422 may include a destination IP address and a corresponding next hop or interface address indicating how to send an IP packet. Based on the destination IP address in the IP packet, a next hop IP or interface address can be determined using, for example, a longest prefix match method in LPM routing table 422. Various LPM techniques may be used, including, for example, concise lookup table hash (Colt Hash) technique where prefixes of IP addresses are transformed and stored in a hash table for LPM routing. When an entry in LPM routing table 422 matches the destination IP address based on the longest prefix match, the corresponding next hop or interface address can be used to index into LPM pointer table 424. Each LPM pointer table entry may include a pointer, a pointer type (such as next hop IP pointer, WCMP pointer, or tunnel pointer), an action (such as DROP, FWD2CPU, or MIRROR), and a user metadata field. A next hop or tunnel can thus be selected from LPM pointer table 424. For example, the pointer type in an LPM pointer table entry may indicate that the pointer is a tunnel pointer and the pointer points to a tunnel group as described in detail below with respect to tunnel initiation circuit 430. The pointer type in an LPM pointer table entry may indicate that the pointer is a WCMP pointer and the pointer points to a WCMP group as described in detail below with respect to multipath circuit 440. The pointer type in an LPM pointer table entry may also indicate that the pointer is a next hop pointer and the pointer indicates an index into a next hop table as described in detail below with respect to next hop table lookup circuit 460.

Tunnel initiation circuit 430 may look up tunnel initiation data to start or initiate a tunnel for a packet. Tunnel initiation circuit 430 may include a tunnel group table 432 and a tunnel pointer table 434 for tunnel lookup. Tunnel initiation circuit 430 may select a tunnel from a tunnel group based on a tunnel hash value generated by other circuits, such as a Parser, and the tunnel pointer from IP header processing circuit 420. Tunnel group table 432 may be configurable to support, for example, 512 groups each with 32 elements or 2 K groups each with 8 elements. Each entry in tunnel group table 432 may include a range value for each element. The tunnel pointer value may be used to select a group number and the tunnel hash value may be used to select an element number. The selected group number and element number may be concatenated to form a pointer pointing to tunnel pointer table 434, and the tunnel pointer table entry associated with the pointer can be identified. Tunnel pointer table 434 may include, for example, 16 K tunnel pointer entries (for example, one for each of the 32 elements in the 512 groups or one for each of the 8 elements in the 2 K groups). Each tunnel pointer entry may include a WCMP group pointer, an LS outer label table pointer, or a next hop pointer, and tunnel initiation information for an IP tunnel or an LS tunnel. In some embodiments, tunnel pointer table 434 may be accessed directly, skipping tunnel group table 432, to more efficiently support tunnel initiation with no hashing function. For an LS tunnel, two tunnel header (an inner one and an outer one) may be selected. The inner LS header may be determined using tunnel pointer table 434 with or without applying a flow hash function using tunnel group table 432. The outer LS header may be determined by LS outer label determination circuit 450.

Figure 5:
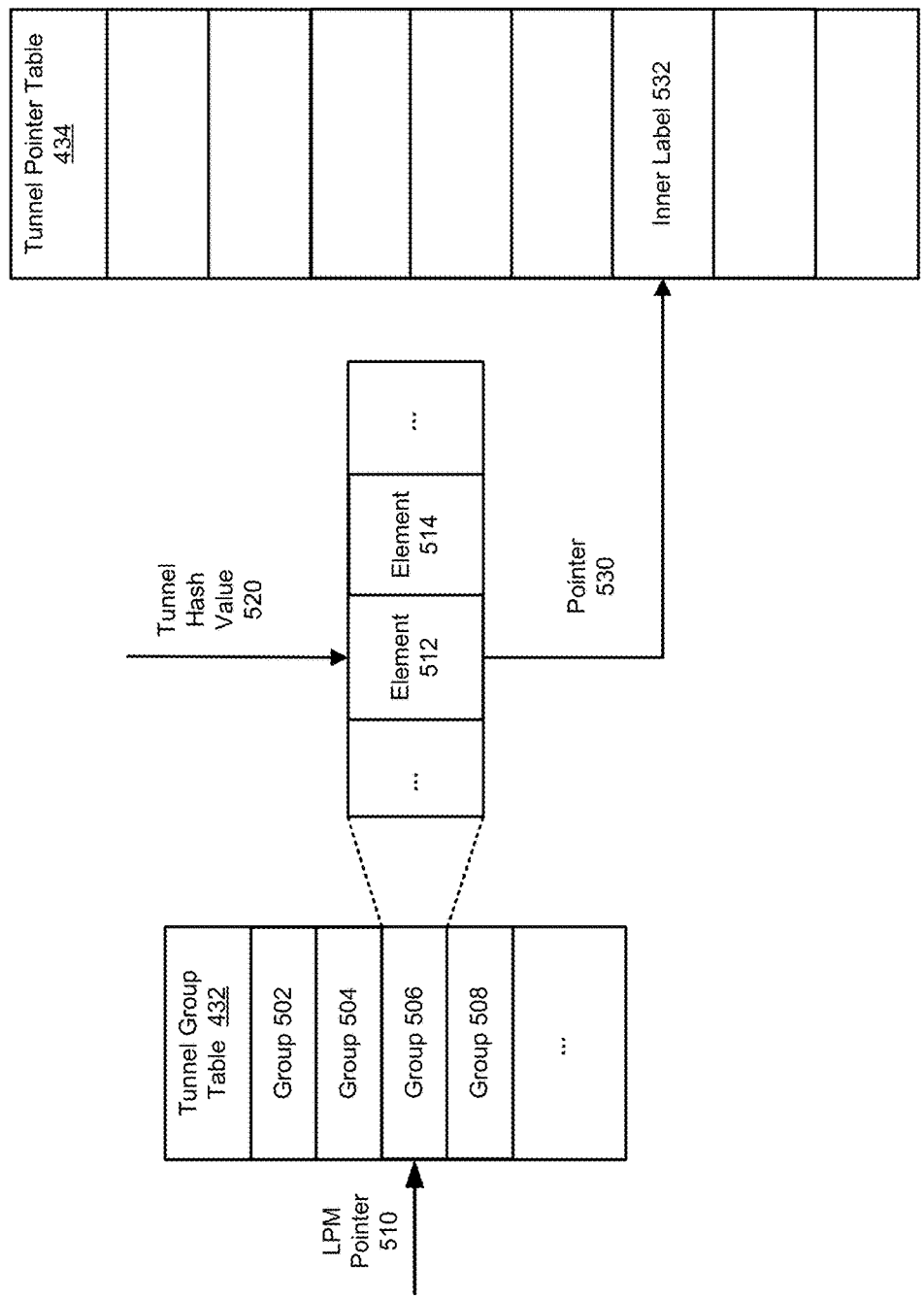
FIG. 5 is an example logical block diagram illustrating a tunnel group table and a tunnel pointer table, according to some embodiments.

FIG. 5 is an example logical block diagram illustrating a tunnel group table and a tunnel pointer table, according to some embodiments. Tunnel group table 432 may include a plurality of tunnel groups, such as groups 502, 504, 506, 508. Each group includes a number of elements. For example, group 506 is illustrated as including elements 512, 514, etc. Hash ranges may be assigned to the elements in a group. In this way, traffic may be distributed across elements in a group (and thus pointers in tunnel pointer table 434) according to an equal cost (for example, equal hash ranges) or weighted cost (for example, different hash ranges) distribution scheme. Tunnel groups may be identified by, for example, LPM pointer 510 generated by IP header processing circuit 420, which points to one of the tunnel groups, for example, group 506. To select from among the multiple elements in a tunnel group, a tunnel hash value 520 is utilized. As described above, tunnel hash value 520 may be a hash value generated by, for example, a parser or some other packet processing circuits prior to tunnel initiation circuit 430 based on different fields in the packet and/or other metadata in the packet. Tunnel hash value 520 may fall within a range assigned to one of the elements, for example, element 512. A pointer 530 to tunnel pointer table 434 may be determined using element 512 and group 506 to identify an LS inner label 532 in tunnel pointer table 434.

Referring back to FIG. 4, multipath resolution circuit 440 may distribute network traffic among multiple valid paths in a network using, for example, WCMP or ECMP. Paths may be selected based on a hash value of the network traffic flow. In addition, allocations of network traffic can be weighted per network traffic flow. Similar to tunnel initiation circuit 430, multipath resolution circuit 440 may include a multipath group table 442 and a multipath pointer table 444. In this way, the group elements (as discussed above with regard to FIG. 5) may be programmed to direct network traffic to valid paths according to the weighting of the network traffic flows assigned to each group element in multipath pointer table 444 for a group in multipath group table 442. Entries in multipath pointer table 444 may include information to direct network traffic according to the corresponding valid path, a pointer, and the type of the pointer. The type of the pointer may indicate which one of the subsequent circuits may process the packet.

LS outer label determination circuit 450 may provide new LS labels for some packets being tunneled in LS. For example, in an LS PUSH or SWAP operation, a new outer label may be obtained by looking up an LS outer label table. Entries in the LS outer label table may include an indication of whether an entry is valid, information describing or pointing to a new outer label to be added/swapped (for example, an outer label index), a pointer, and the pointer type.

In some embodiments, hardware pipeline 400 may include next hop table lookup circuit 460. Next hop table lookup circuit 460 may provide a next hop address (which may be a directly connected host to the networking device or an indirectly connected subnet) for different network packets corresponding to various forwarding routes as may be pointed to by other destination resolution circuits such as tunnel initiation circuit 430, multipath resolution circuit 440, and/or LS outer label determination circuit 450. If a pointer does not point to a valid entry in a next hop table in next hop table lookup circuit 460, the network packet may be trapped, forwarded, or logged for a controller to handle. An entry in the next hop table may include an indication as to whether the entry is valid, an entry for address resolution protocol (ARP), a destination MAC address index, an indication as to whether an egress virtual local area network (VLAN) is valid, an egress VLAN, an egress logical port indication, an indication of the maximum transmission unit (MTU), and an indication as to whether the network packet should be mirrored. In some embodiments, entries may also include tunnel information (which may supersede tunnel information provided by tunnel initiation circuit 430), such as an indication as to whether tunneling is enabled for the network packet, an index or location of a tunnel header to insert to enable tunneling, and a tunnel header size.

In some embodiments, hardware pipeline 400 may include fast re-route table lookup circuit 470. Fast re-route table lookup circuit 470 may provide a quick substitution using a backup link when a link goes down. For an MPLS packet, if fast re-route is enabled for the logical port selected in the next hop table lookup circuit 460, the packet may be encapsulated with an fast re-route label and provided with an alternate egress port and direct memory access control (DMAC) address. Fast re-route label insertion may be enabled and disabled per port (logical or physical) using control registers that indicate whether the port has fast re-route enabled or disabled (i.e. whether the port is down or up). A controller may set the fast re-route label and alternate egress and DMAC address in advance as a backup route, and enable it with a change to the control register when a particular port goes down, so that MPLS packets that are meant to egress on that particular port will use the backup route.

In some embodiments, hardware pipeline 400 may include LAG table lookup circuit 480. LAG table lookup circuit 480 may enable sharing of bandwidth across multiple ports. LAG table lookup circuit 480 may be implemented like tunnel initiation circuit 430 and multipath resolution circuit 440, using an LAG group table 482 to select entries in an LAG pointer table 484. A particular entry in LAG pointer table 484 may be determined according to a hash value generated for LAG table lookup circuit 480, which may be different from the hash values generated for tunnel initiation circuit 430 and multipath resolution circuit 440. In some embodiments, LAG table lookup circuit 480 provides an even distribution of traffic across entries for a group in LAG pointer table 484. In some embodiments, weighted distribution may be programmed.

In various embodiments, the hardware pipeline may include two or more LS header processing circuits 410, two or more IP header processing circuits 420, two or more tunnel initiation circuits 430, two or more multipath resolution circuits 440, or two or more LS outer label determination circuits in the pipeline as needed.

As described above, network packets can be processed by hardware pipeline 400 in a pipeline without recirculating any packet or packet header, where LS header processing circuit 410, IP header processing circuit 420, tunnel initiation circuit 430, and LS outer label determination circuit 450 can sequentially process a same packet and concurrently process different packets. For example, each LS packet may pass through LS header processing circuit 410, IP header processing circuit 420, tunnel initiation circuit 430, and LS outer label determination circuit 450 sequentially. When a first LS packet is being processed by LS outer label determination circuit 450, a second LS packet may be processed by tunnel initiation circuit 430, a third LS packet may be processed by IP header processing circuit 420, and a fourth LS packet may be processed by LS header processing circuit 410 at the same time. As such, the latency and throughput of an LS router using hardware pipeline 400 may be improved.

In various embodiments, results from each of circuits 410, 420, 430, 440, 450, 460, 470, and 480 may be written as metadata and passed to subsequent circuits, which may perform operations on the packets or the headers of the packets based on the metadata.

As shown in FIG. 4, any of LS header processing circuit 410, IP header processing circuit 420, tunnel initiation circuit 430, multipath resolution circuit 440, and LS outer label determination circuit 450 may be bypassed based on the LS headers or the IP headers in the received packets and/or processing results from a prior circuit. Therefore, there are various possible paths for an LS or an L3 packet to travel through hardware pipeline 400 as described in detail below with respect to FIGS. 6-11. LS header processing circuit 410, IP header processing circuit 420, tunnel initiation circuit 430, multipath resolution circuit 440, and LS outer label determination circuit 450 may be bypassed using, for example, digital switches in a combinational logic. In various embodiments, hardware pipeline 400 may be implemented in one or more ASICs, one or more FPGAs, one or more SoCs, one or more SiPs, or a portion of an ASIC, FPGA, SoC, or SiP.

The following sections describe some example paths for different operations on LS and L3 packets.

Figure 6:
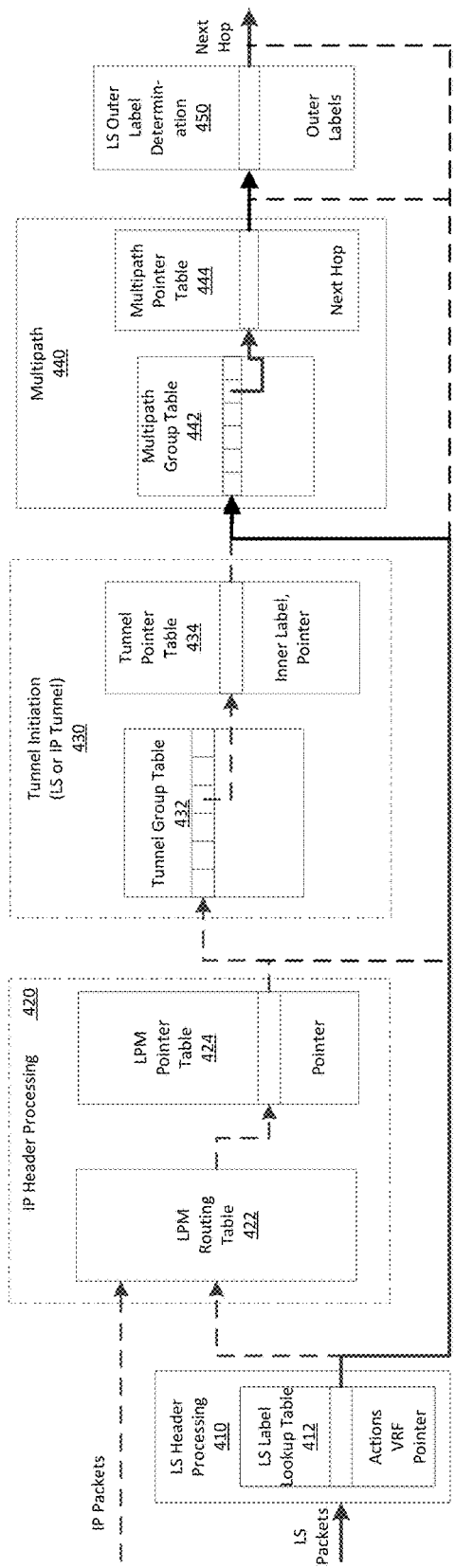
FIG. 6 is a block diagram illustrating an example LS label SWAP operation.

FIG. 6 is a block diagram 600 illustrating an example LS label SWAP operation, which can be performed by a hardware pipeline, such as hardware pipeline 400. In this example, hardware pipeline 400 receives LS packets. LS header processing circuit 410 may examine the outermost label in an LS label stack of a received LS packet, and use the outermost label in the LS label stack and LS label lookup table 412 to find a corresponding action for the LS packet, a VRFID for the packet, and a pointer to, for example, a WCMP table or LS outer label table, for a given LS label in the packet. In the example shown in FIG. 6, the action to be taken on the LS packet is a SWAP operation, in which the outermost LS label is swapped with a new label and the packet can be forwarded to a next LSR along the path associated with the new label. As described above, the new LS label may be obtained using, for example, multipath resolution circuit 440 and LS outer label determination circuit 450. In the example, IP lookup or tunnel initiation is not performed, and thus IP header processing circuit 420 and tunnel initiation circuit 430 can be bypassed.

Figure 7:
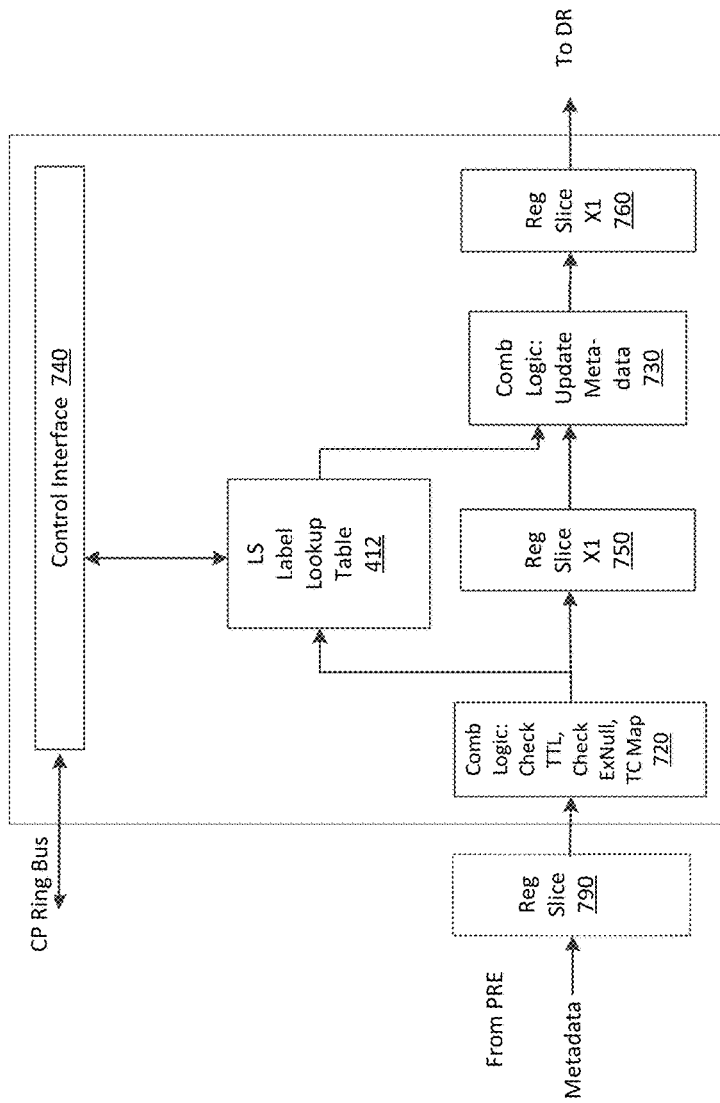
FIG. 7 is a block diagram of an example LS header processing circuit.

FIG. 7 is a block diagram of an example LS header processing circuit 410. LS header processing circuit 410 may include LS label lookup table 412, a combinational logic 720 for TTL check, Explicit Null check, and LS traffic class mapping, and a combinational logic 730 for updating metadata. LS header processing circuit 410 may also include a control interface 740 connected to a control plane ring bus, and register slices 750 and 760 for data storage. LS header processing circuit 410 may process an LS packet, such as an MPLS packet, by, for example, looking up an LS label in LS label lookup table 412 to get an action for the packet, detecting an Explicit Null label, checking TTL, mapping the LS traffic class to a scheduler priority, and mapping the LS traffic class to differentiated services code point (DSCP) when exiting an LS tunnel.

The TTL check may be done based on the action looked up in LS label lookup table 412. For example, for an LS SWAP action, the TTL for the outermost LS label may be checked to determine whether it is greater than a threshold value, such as one. For an LS POP operation on a packet with more than one label, the TTLs for the outermost LS label and the inner LS label are checked to determine whether they are greater than a threshold value, such as one. For an LS POP action on a packet with one LS label (tunnel termination case), the TTL for the outermost LS label is checked to determine whether it is greater than a threshold value, such as one, and the TTL for the IP header will be checked in a subsequent circuit. The TTL check fails if the TTL being checked is not greater than the threshold value. The metadata may be updated and the packet may be forwarded to a CPU if the TTL check fails.

LS label lookups can be done using, for example, LS label lookup table 412, based on an outermost LS label of an LS label stack in a packet. 8 K or more labels can be supported, including reserved labels, in LS label lookup table 412. Each entry in LS label lookup table 412 may include, for example, a VALID field (for example, 1 bit), an LS action field (for example, 2 bits), a pointer type field (a WCMP group or LS outer label table pointer) (for example, 1 bit), a pointer field (for example, 15 bits), a SET_VRFID field (for example, 1 bit), a VRFID field (for example, 4 bits), a DROP field (for example, 1 bit), a FWD2CPU field (for example, 1 bit), and a MIRROR field (for example, 1 bit). The VALID field may indicate whether the entry is valid. The LS action field may indicate whether a PUSH, POP, or SWAP operation is to be performed for the packet. The DROP and FWD2CPU fields specify the action of dropping the packet and forwarding the packet to the CPU, respectively. The MIRROR field specifies whether the packet should be mirrored.

In some embodiments, LS header processing circuit 410 may process multiple LS labels of a packet sequentially in a pipeline. For example, combinational logic 720 may check for an Explicit NULL label ("0") at the top (outermost) label of the LS label stack. An Explicit Null label indicates that a POP operation is to be performed on the LS label stack. If an Explicit Null label is found at the top of the LS label stack, the LS label next to the top of the LS label stack may be used to look up in LS label lookup table 412 to determine an action for the packet.

In some situations, an LS miss may occur during LS label lookups. The LS miss may be caused by a label that is outside the label range of the LS label lookup table, or is equal to a reserved label (for example, 1 or 3-15). When an LS miss occurs, the packet may be dropped or copied to the CPU for handling.

In some embodiments, LS header processing circuit 410 may include two or more LS label lookup tables 412, or two or more combinational logic circuits as needed to process two or more LS labels in a single pipeline.

Figure 8:
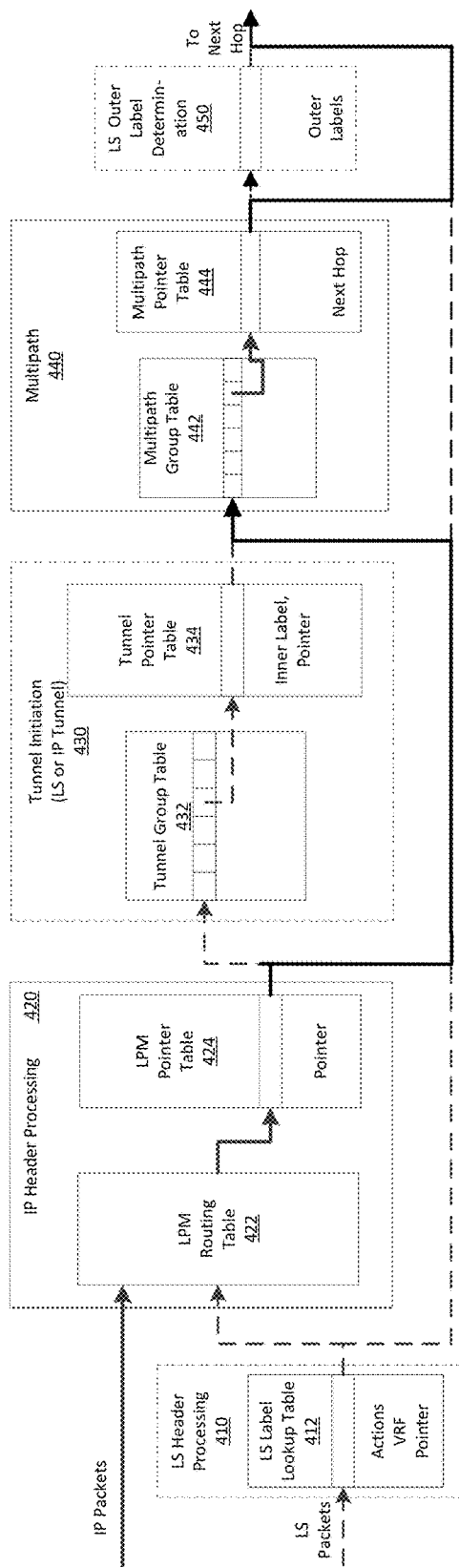
FIG. 8 is a block diagram illustrating an example IP lookup operation without tunnel initiation.

FIG. 8 is a block diagram 800 illustrating an example IP lookup operation without tunnel initiation, which can be performed by a hardware pipeline, such as hardware pipeline 400. In FIG. 8, hardware pipeline 400 receives IP packets instead of LS packets. Thus, LS header processing circuit 410 can be bypassed and the IP packets instead go to IP header processing circuit 420. IP header processing circuit 420 may identify the destination IP address from the IP packet header. As described above, using the destination IP address, a next hop IP or interface address can be determined using a longest prefix match in LPM routing table 422. The determined next hop IP or interface address can then be used to index into LPM pointer table 424 to obtain information regarding the next hop or tunnel. In the example shown in FIG. 8, the LPM pointer table entry selected from LPM pointer table 424 includes a pointer type of WCMP pointer, rather than a tunnel pointer. Thus, tunnel initiation circuit 430 is bypassed. The LPM pointers from IP header processing circuit 420 can be forwarded to multipath resolution circuit 440 as described above, which may determine a pointer pointing to an entry in the next hop table in next hop table lookup circuit 460 that identifies the next hop address as described above with respect to next hop table lookup circuit 460. LS outer label determination circuit 450 is not used and thus can be bypassed.

Figure 9:
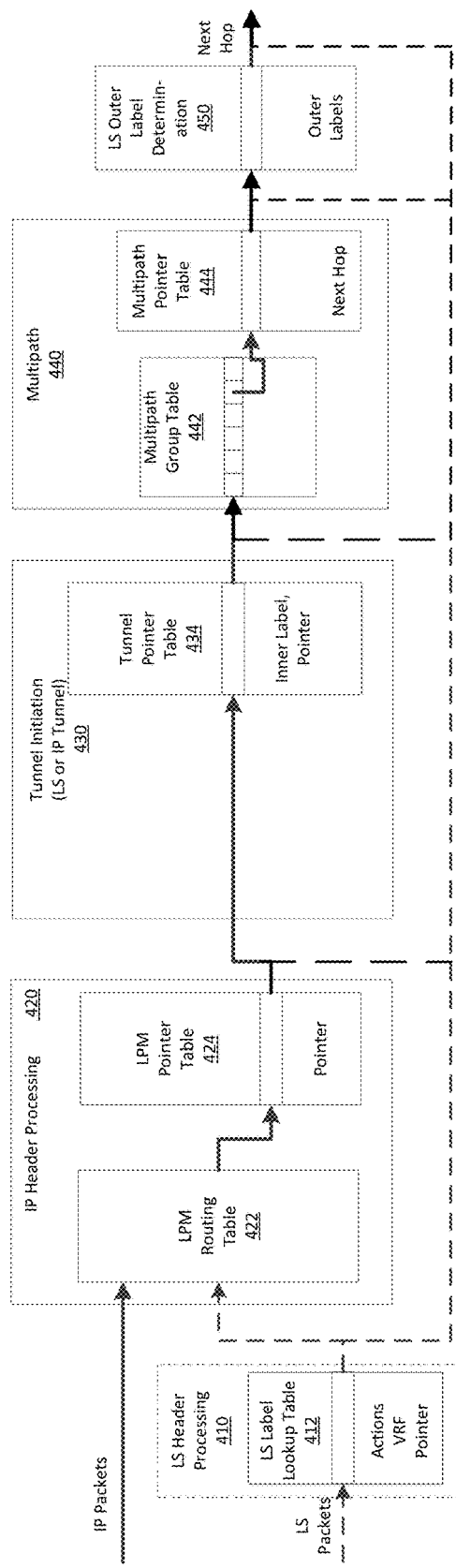
FIG. 9 is a block diagram illustrating an example IP lookup operation and an example tunnel initiation operation in a pipeline.

FIG. 9 is a block diagram 900 illustrating an example IP lookup operation and an example tunnel initiation operation in a pipeline, which can be performed by a hardware pipeline, such as hardware pipeline 400. In FIG. 9, hardware pipeline 400 receives IP packets instead of LS packets. Thus, LS header processing circuit 410 is bypassed and the IP packets instead go to IP header processing circuit 420. IP header processing circuit 420 may identify the destination IP address from the IP packet header. Using the packet destination IP address, a next hop IP or interface address can be determined using a longest prefix match in LPM routing table 422. The determined next hop IP or interface address can then be used to index into LPM pointer table 424 to obtain information regarding the next hop or tunnel. In the example shown in FIG. 9, the LPM pointer table entry selected from LPM pointer table 424 includes a pointer type of tunnel pointer. Thus, tunnel initiation circuit 430 is used to initiate a tunnel and obtain an inner LS header, with or without applying a flow hash function using tunnel group table 432. The packet can then be forwarded to other destination resolution circuits such as multipath resolution circuit 440 and LS outer label determination circuit 450, where, for example, the LS outer label may be obtained from the LS outer label table as described above with respect to FIG. 4.

Figure 10:
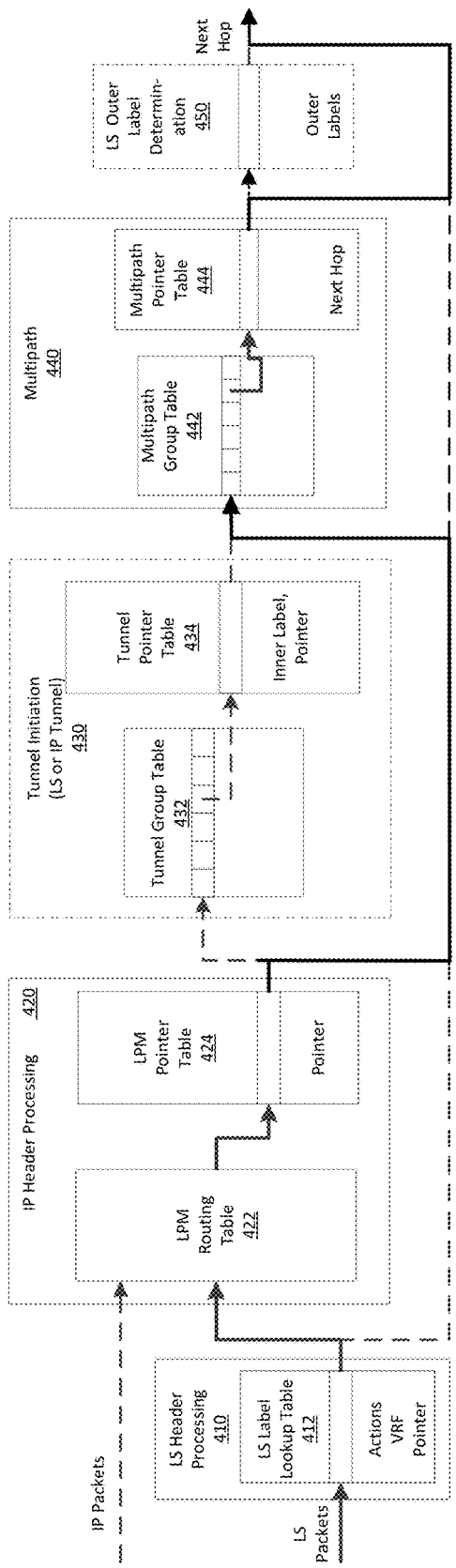
FIG. 10 is a block diagram illustrating an example LS POP operation and an example IP lookup operation in a pipeline.

FIG. 10 is a block diagram 1000 illustrating an example LS POP operation and an example IP lookup operation in a pipeline, which can be performed by a hardware pipeline, such as hardware pipeline 400. The LS POP operation and the IP lookup operation may be done at an egress LER in an LS tunnel exit flow. As discussed above with respect to FIG. 7, LS header processing circuit 410 may examine the outermost label in the LS headers of a received LS packet, and use the outermost label in the LS headers and LS label lookup table 412 to find a corresponding action for the LS packet, a VRFID for the packet, and a pointer to, for example, multipath group table 442 or the LS outer label table in LS outer label determination circuit 450, for a given LS label in the packet. In FIG. 10, an LS tunnel may be terminated due to a POP operation or Explicit Null label at the bottom of an LS label stack in an LS packet. The VRFID corresponding to the Explicit Null label may be used with the IP address in the IP header of the IP packet encapsulated by the LS header for an IP lookup. The IP lookup can be performed by IP header processing circuit 420 as discussed above with respect to FIG. 8. As in FIG. 8, in the example shown in FIG. 10, the LPM pointer table entry selected from LPM pointer table 424 includes a pointer type of WCMP pointer, rather than a tunnel pointer. Thus, tunnel initiation circuit 430 is bypassed. The LPM pointer from IP header processing circuit 420 can be forwarded to multipath resolution circuit 440 as described above, which may determine a pointer pointing to an entry in the next hop table in next hop table lookup circuit 460 that identifies the next hop address. LS outer label determination circuit 450 is not used and thus can be bypassed.

Figure 11:
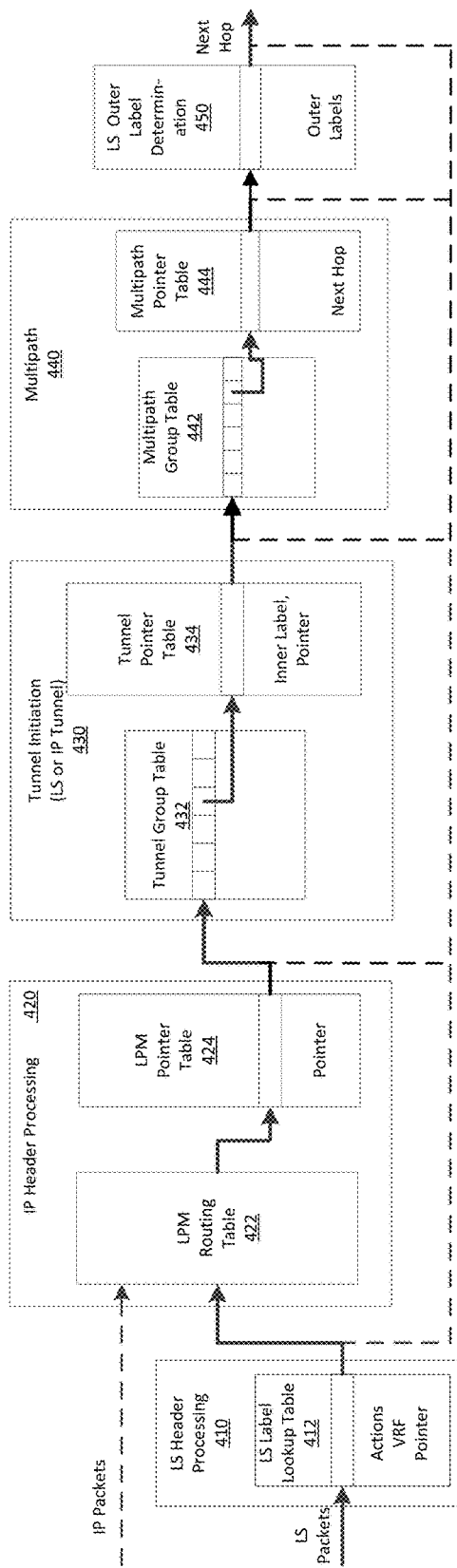
FIG. 11 is a block diagram illustrating an example LS POP operation, an example IP lookup operation, and an example LS PUSH operation in a pipeline.

FIG. 11 is a block diagram 1100 illustrating an example LS POP operation, an example IP lookup operation, and an example LS PUSH operation in a pipeline, which can be performed by a hardware pipeline, such as hardware pipeline 400. The LS POP operation, IP lookup operation, and LS PUSH operation may be performed when an LS tunnel is terminated followed by the initiation of a new tunnel. As in FIG. 10, in the example shown in FIG. 11, hardware pipeline 400 receives an LS packet, and an LS tunnel may be terminated due to a POP operation or an Explicit Null label at the bottom of an LS label stack in the LS packet. The VRFID corresponding to Explicit Null label can be used with the IP address in the IP header of the IP packet encapsulated by the LS header for an IP lookup. The IP lookup can be performed by IP header processing circuit 420 using the VRFID and the IP header. The IP lookup points to an LPM pointer table entry in LPM pointer table 424, the LPM pointer table entry including a point type of tunnel pointer. A new LS tunnel can then be initiated and an inner LS header can be obtained by accessing a tunnel pointer entry in tunnel pointer table 434. The packet can then be forwarded to other destination resolution circuits such as a multipath resolution circuit 440 and LS outer label determination circuit 450, where, for example, an LS outer label may be obtained from the LS outer label table as described above with respect to FIG. 4. Thus, the LS POP operation, IP lookup operation, and LS PUSH operation can be performed in a pipeline by hardware pipeline 400 to terminate an existing LS tunnel and start a new LS tunnel, without sending a packet to a same processing circuit twice.

III. Example Methods

FIG. 12 is a flow chart illustrating an example pipelined process 1200, according to some embodiments of the present disclosure. Some or all of process 1200 (or any other processes described herein, or variations, and/or combinations thereof) may be performed under the control of one or more electronic circuits, and/or under the control of one or more computer systems configured with executable instructions (e.g., software or firmware instructions, or one or more computer programs). The instructions can be executed by a processor or other circuitry. The instructions may be stored on a computer-readable storage medium. The computer-readable storage medium may be non-transitory.

At block 1210, an integrated circuit may receive an LS packet including an LS header and an IP header. The LS header includes an LS label. In some embodiments, means for performing the function at block 1210 may include, but are not limited to, for example, LS header processing circuit 410 in hardware pipeline 400, as illustrated in FIG. 4 and described in detail above.

At block 1220, an LS header processing circuit in the integrated circuit may determine a first operation for the packet using an LS lookup table and the LS header. The first operation may include one of a PUSH, SWAP or POP operation as described above. For example, the LS header processing circuit may check an outermost LS label in the LS label stack and determine whether the outermost LS label in the LS label stack is an Explicit Null ("0") (or a functionally equivalent value). If the outermost LS label in the LS label stack is an Explicit Null, a POP operation may be selected for the packet, in which the outermost LS label Explicit Null is removed. The LS header processing circuit may also check the LS label stack and determine whether the outermost LS label Explicit Null is at the bottom of the LS label stack. If the outermost LS label Explicit Null is at the bottom of the LS label stack, the current LS tunnel may be terminated. If the outermost LS label Explicit Null is not at the bottom of the LS label stack, a POP operation may be selected for the LS packet and an LS lookup may then be performed using the next label in the LS label stack and an LS label lookup table to determine another operation for the packet, as described above with respect to FIGS. 4, 6, and 7. In some embodiments, the LS lookup table may include a plurality of entries, where each entry includes a VRFID. In some embodiments, means for performing the function at block 1220 may include, but are not limited to, for example, LS header processing circuit 410 in hardware pipeline 400, as illustrated in FIGS. 4 and 7 and described in detail above.

At block 1230, an IP header processing circuit of the integrated circuit may select a second operation for the packet using an IP lookup table and the IP header in the packet, as described above with respect to FIGS. 4 and 8-11. In some embodiments, the IP lookup table is selected using the VRFID in an entry in the LS lookup table, the entry corresponding to the packet. In some embodiments, the second operation may include forwarding the packet to a next-hop IP router, a multipath resolution circuit, or a tunnel initiation circuit. In some embodiments, means for performing the function at block 1230 may include, but are not limited to, for example, IP header processing circuit 420 in hardware pipeline 400, as illustrated in FIG. 4 and described in detail above.

At block 1240, a tunnel initiation circuit may determine a first LS label for the packet to initiate an LS tunnel or IP tunnel as described above with respect to FIGS. 4, 9, and 11. In some embodiments, means for performing the function at block 1240 may include, but are not limited to, for example, tunnel initiation circuit 430, and/or multipath resolution circuit 440 and LS outer label determination circuit 450 in hardware pipeline 400, as illustrated in FIG. 4 and described in detail above.

FIG. 13 is a flow chart illustrating an example pipelined process 1300, according to some embodiments of the present disclosure. At block 1310, an integrated circuit may receive a packet including an IP header and an LS header, such as an MPLS header. The LS header includes an LS label. In some embodiments, means for performing the function at block 1310 may include, but are not limited to, for example, LS header processing circuit 410 in hardware pipeline 400, as illustrated in FIGS. 4 and 7 and described in detail above.

At block 1320, an LS header processing circuit in the integrated circuit may determine a first operation for the packet using an LS lookup table and the LS header in the packet as in block 1220 of FIG. 12. In some embodiments, means for performing the function at block 1320 may include, but are not limited to, for example, LS header processing circuit 410 in hardware pipeline 400, as illustrated in FIGS. 4 and 7 and described in detail above.

At block 1330, the LS header processing circuit may perform a TTL check to determine whether the packet is valid, by comparing a TTL value in an LS header or an IP header with a threshold as described above with respect to FIG. 7. The TTL check fails if the TTL being checked is not greater than the threshold value. If the TTL check fails, metadata may be updated and the packet may be forwarded to a CPU. In some embodiments, means for performing the function at block 1330 may include, but are not limited to, for example, LS header processing circuit 410 in hardware pipeline 400, as illustrated in FIG. 4 and described in detail above.

At block 1340, an IP header processing circuit of the integrated circuit may select a second operation for the packet using an IP lookup table and the IP header of the packet, as described above with respect to block 1230 of FIG. 12. In some embodiments, means for performing the function at block 1340 may include, but are not limited to, for example, IP header processing circuit 420 in hardware pipeline 400, as illustrated in FIGS. 4 and 7 and described in detail above.

At block 1350, a tunnel initiation circuit of the integrated circuit may initiate a new LS tunnel for the packet and determine a first LS label for the packet as described above with respect to FIGS. 4, 9, and 11. In some embodiments, means for performing the function at block 1350 may include, but are not limited to, for example, tunnel initiation circuit 430 in hardware pipeline 400, as illustrated in FIG. 4 and described in detail above.

At block 1360, an LS outer label determination circuit may determine an second LS label for the packet as described above with respect to FIGS. 4, 6, 9, and 11. The second LS label is to be added on top of the first LS label in an LS label stack for the packet. In some embodiments, means for performing the function at block 1360 may include, but are not limited to, for example, LS outer label determination circuit 450 in hardware pipeline 400, as illustrated in FIG. 4 and described in detail above.

It is noted that even though FIGS. 12 and 13 describe example pipelined processes as a sequential process for a packet, many of the operations can be performed in parallel or concurrently for different packets. In addition, the order of the operations may be rearranged. An operation may have additional steps not included in the figure. Some operations may be optional, and thus may be omitted in various embodiments. Furthermore, embodiments of the pipelined processes may be implemented in hardware, software, firmware, middleware, microcode, hardware description languages, or any combination thereof.

FIG. 14 is a flow chart illustrating an exemplary embodiment of an LS label processing flow 1400 that can be performed by a hardware pipeline, such as hardware pipeline 400. Flow 1400 starts at block 1410, where an LS label of an LS label stack in an LS packet, such as the outermost LS label in the LS label stack, is processed by, for example, combinational logic 720 of LS header processing circuit 410, to determine whether it is an Explicit Null label.

If the current LS label being processed is an Explicit Null, flow 1400 proceeds to block 1420, where the LS label stack is checked to determine whether the Explicit Null label is at the bottom of the LS label stack. At block 1430, if the Explicit Null label is not at the bottom of the LS label stack, combinational logic 720 may set "explicit null present" in metadata and indicate a POP operation for the LS packet in the metadata. A POP operation will cause the next LS label beneath the Explicit NULL to rise to the top of the LS label stack. An LS lookup may then be performed using the next label and, for example, LS label lookup table 412 of LS header processing circuit 410 to determine an action for the LS packet. At block 1440, if the Explicit Null label is at the bottom of the LS label stack, LS header processing circuit 410 may write "explicit null present" and actions retrieved from an Explicit Null Actions control and status register (CSR) to the metadata, and terminate the LS tunnel. The Explicit Null Actions CSR may include a SET_VRFID field (1 bit), a VRFID field (4 bits), a DROP field (1 bit), a FWD2CPU field (1 bit), and a MIRROR field (1 bit). The metadata may be used by subsequent circuits to perform an IP lookup.

If the current label in the LS label stack is not an Explicit Null, flow 1400 proceeds to block 1450, where the current label in the LS label stack is used as an index to search in an LS label lookup table, such as LS label lookup table 412, to determine whether there is an LS label lookup table hit for the current label. An LS label lookup table miss may occur during LS label lookups because, for example, the LS label is outside the label range of the LS label lookup table, or is equal to a reserved label (for example, 1 or 3-15). At block 1460, if there is an LS label lookup table hit for the current label, the hit entry in the LS label lookup table is retrieved and the metadata is written based on the hit entry in the LS label lookup table, which may provide an LS action, a multipath group pointer or LS outer label table pointer, a SET_VRFID bit, a VRFID field, an action for the packet (such as FWD2CPU or DROP), and a MIRROR bit. At block 1470, if there is an LS label lookup table miss for the current label, LS header processing circuit 410 may write "DENY" (FWD2CPU=0, DROP=1) to the metadata based on the LS miss action CSR to the metadata. The LS miss action CSR may provide an action (such as FWD2CPU or DROP) and a MIRROR bit for the packet. For example, the packet may be dropped by setting the DROP field to 1 or copied to the CPU by setting the FWD2CPU field to 1.

IV. System Examples

Figure 15:
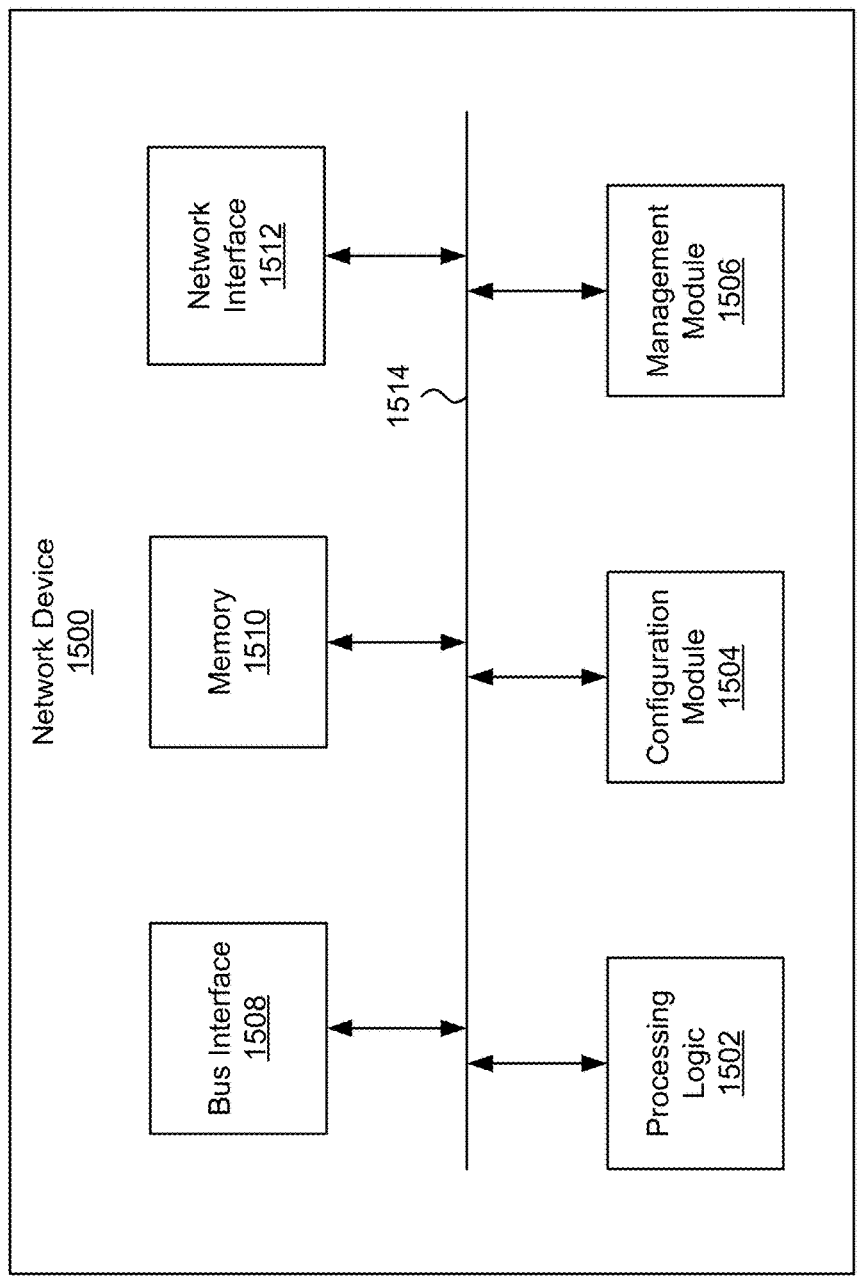
FIG. 15 illustrates an example architecture for features and systems described herein that includes one or more service provider computers and/or a user device connected via one or more networks, according to some embodiments.

FIG. 15 illustrates an example of a network device 1500. Functionality and/or several components of the network device 1500 may be used without limitation with other embodiments disclosed elsewhere in this disclosure, without limitations. A network device 1500 may facilitate processing of packets and/or forwarding of packets from the network device 1500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1500 may be the recipient and/or generator of packets. In some implementations, the network device 1500 may modify the contents of the packet before forwarding the packet to another device. The network device 1500 may be a peripheral device coupled to another computer device, a switch, a router or any other suitable device enabled for receiving and forwarding packets.

In one example, the network device 1500 may include processing logic 1502, a configuration module 1504, a management module 1506, a bus interface module 1508, memory 1510, and a network interface module 1512. These modules may be hardware modules, software modules, or a combination of hardware and software. In certain instances, modules may be interchangeably used with components or engines, without deviating from the scope of the disclosure. The network device 1500 may include additional modules, not illustrated here, such as components discussed with respect to the nodes disclosed in FIG. 15. In some implementations, the network device 1500 may include fewer modules. In some implementations, one or more of the modules may be combined into one module. One or more of the modules may be in communication with each other over a communication channel 1514. The communication channel 1514 may include one or more busses, meshes, matrices, fabrics, a combination of these communication channels, or some other suitable communication channel.

The processing logic 1502 may include ASICs, FPGAs, SoCs, network processing units (NPUs), processors configured to execute instructions or any other circuitry configured to perform logical arithmetic and floating point operations. Examples of processors that may be included in the processing logic 1502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 caches, and/or level 2 caches. The instructions executed by the processing logic 1502 may be stored on a computer-readable storage medium, for example, in the form of a computer program. The computer-readable storage medium may be non-transitory. In some cases, the computer-readable medium may be part of the memory 1510.

The memory 1510 may include either volatile or non-volatile, or both volatile and non-volatile types of memory. The memory 1510 may, for example, include random access memory (RAM), read only memory (ROM), Electrically Erasable Programmable Read-Only Memory (EEPROM), flash memory, and/or some other suitable storage media. In some cases, some or all of the memory 1510 may be internal to the network device 1500, while in other cases some or all of the memory may be external to the network device 1500. The memory 1510 may store an operating system comprising executable instructions that, when executed by the processing logic 1502, provides the execution environment for executing instructions providing networking functionality for the network device 1500. The memory may also store and maintain several data structures and routing tables for facilitating the functionality of the network device 1500.

In some implementations, the configuration module 1504 may include one or more configuration registers. Configuration registers may control the operations of the network device 1500. In some implementations, one or more bits in the configuration register can represent certain capabilities of the network device 1500. Configuration registers may be programmed by instructions executing in the processing logic 1502, and/or by an external entity, such as a host device, an operating system executing on a host device, and/or a remote device. The configuration module 1504 may further include hardware and/or software that control the operations of the network device 1500.

In some implementations, the management module 1506 may be configured to manage different components of the network device 1500. In some cases, the management module 1506 may configure one or more bits in one or more configuration registers at power up, to enable or disable certain capabilities of the network device 1500. In certain implementations, the management module 1504 may use processing resources from the processing logic 1502. In other implementations, the management module 1506 may have processing logic similar to the processing logic 1502, but segmented away or implemented on a different power plane than the processing logic 1502.

The bus interface module 1508 may enable communication with external entities, such as a host device and/or other components in a computing system, over an external communication medium. The bus interface module 1508 may include a physical interface for connecting to a cable, socket, port, or other connection to the external communication medium. The bus interface module 1508 may further include hardware and/or software to manage incoming and outgoing transactions. The bus interface module 1508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1508 may include the physical layer for any of these bus protocols, including a connector, power management, and error handling, among other things. In some implementations, the network device 1500 may include multiple bus interface modules for communicating with multiple external entities. These multiple bus interface modules may implement the same local bus protocol, different local bus protocols, or a combination of the same and different bus protocols.

The network interface module 1512 may include hardware and/or software for communicating with a network. This network interface module 1512 may, for example, include physical connectors or physical ports for wired connection to a network, and/or antennas for wireless communication to a network. The network interface module 1512 may further include hardware and/or software configured to implement a network protocol stack. The network interface module 1512 may communicate with the network using a network protocol, such as for example TCP/IP, Infiniband, RoCE, Institute of Electrical and Electronics Engineers (IEEE) 802.11 wireless protocols, User Datagram Protocol (UDP), ATM, token ring, frame relay, High Level Data Link Control (HDLC), Fiber Distributed Data Interface (FDDI), and/or Point-to-Point Protocol (PPP), among others. In some implementations, the network device 1500 may include multiple network interface modules, each configured to communicate with a different network. For example, in these implementations, the network device 1500 may include a network interface module for communicating with a wired Ethernet network, a wireless 802.11 network, a cellular network, an Infiniband network, etc.

The various components and modules of the network device 1500, described above, may be implemented as discrete components, as an SoC, as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 15.

Figure 16:
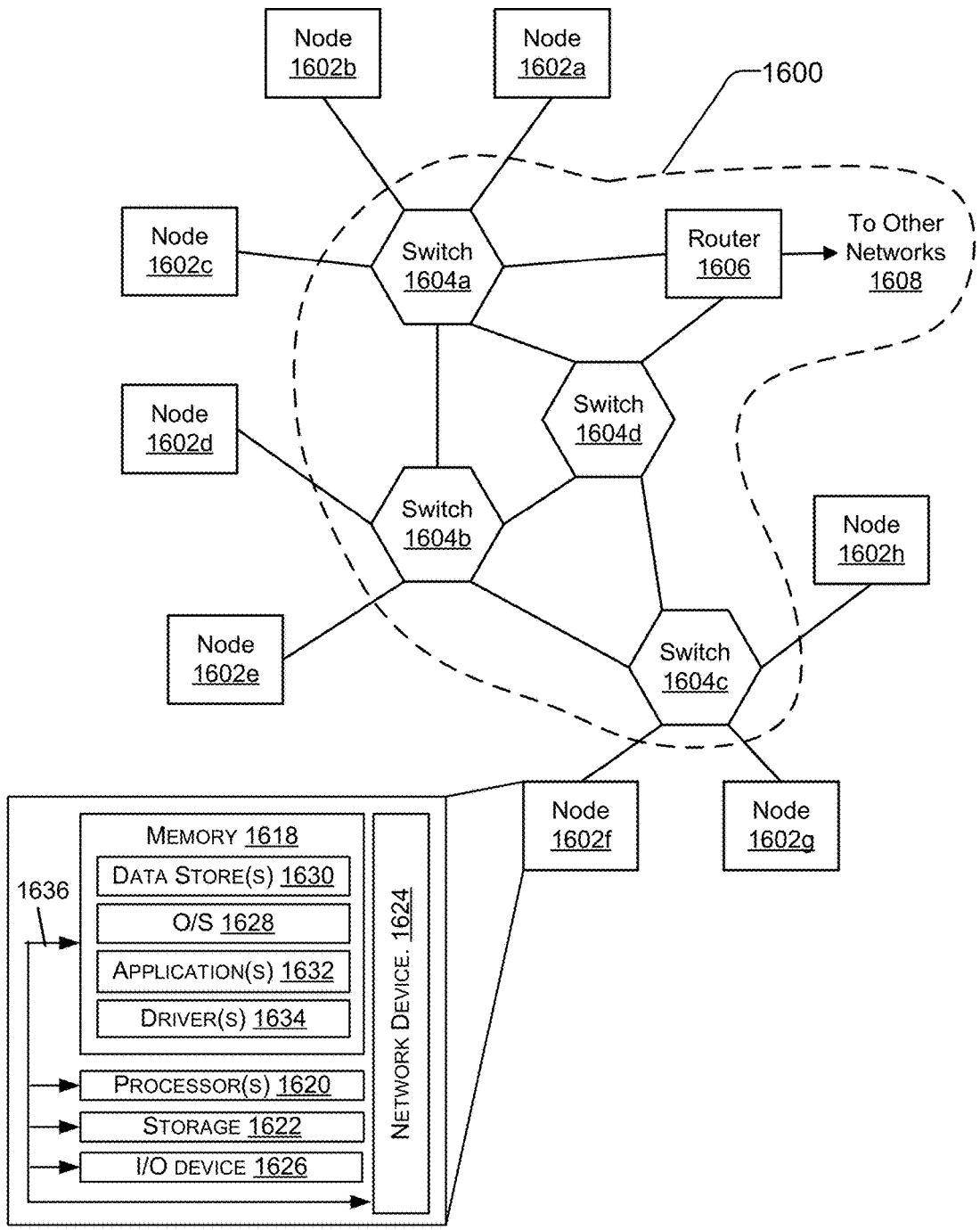
FIG. 16 illustrates aspects of an example environment of a computing system for implementing aspects in accordance with some embodiments.

FIG. 16 illustrates a network 1600, depicting various types of network devices 1500 of FIG. 15, such as nodes comprising the network device, switches and routers. In certain embodiments, the network 1600 may be based on a switched architecture with point-to-point links. As illustrated in FIG. 16, the network 1600 includes a plurality of switches 1604*a*-1604*d*, which may be arranged in a network. In some cases, the switches are arranged in a multi-layered network, such as a Clos network. A network device 1500 that filters and forwards packets between local area network (LAN) segments may be referred to as a switch. Switches generally operate at the data link layer (Layer 2) and sometimes the network layer (Layer 3) of the OSI Reference Model and may support several packet protocols. Switches 1604*a*-1604*d* may be connected to a plurality of nodes 1602*a*-1602*h* and provide multiple paths between any two nodes.

The network 1600 may also include one or more network devices 1500 for connection with other networks 1608, such as other subnets, LANs, wide area networks (WANs), or the Internet, and may be referred to as routers 1606. Routers use headers and forwarding tables to determine the best path for forwarding the packets, and use protocols such as internet control message protocol (ICMP) to communicate with each other and configure the best route between any two devices.

In some examples, network(s) 1600 may include any one or a combination of many different types of networks, such as cable networks, the Internet, wireless networks, cellular networks and other private and/or public networks. Interconnected switches 1604*a*-1604*d* and router 1606, if present, may be referred to as a switch fabric, a fabric, a network fabric, or simply a network. In the context of a computer network, terms "fabric" and "network" may be used interchangeably herein.

Nodes 1602*a*-1602*h* may be any combination of host systems, processor nodes, storage subsystems, and I/O chassis that represent user devices, service provider computers or third party computers.

User devices may include computing devices to access an application 1632 (e.g., a web browser or mobile device application). In some aspects, the application 1632 may be hosted, managed, and/or provided by a computing resources service or service provider. The application 1632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1608. Additionally, the user device(s) may be part of the distributed system managed by, controlled by, or otherwise part of the service provider computer(s) (e.g., a console device integrated with the service provider computers).

The node(s) of FIG. 16 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1602*a*-1602*h* may include at least one memory 1618 and one or more processing units (or processor(s) 1620). The processor(s) 1620 may be implemented in hardware, computer-executable instructions, firmware, or combinations thereof. Computer-executable instruction or firmware implementations of the processor(s) 1620 may include computer-executable or machine-executable instructions written in any suitable programming language to perform the various functions described.

In some instances, the hardware processor(s) 1620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1618 may store program instructions that are loadable and executable on the processor(s) 1620, as well as data generated during the execution of these programs. Depending on the configuration and type of the node(s) 1602*a*-1602*h*, the memory 1618 may be volatile (such as RAM) and/or non-volatile (such as ROM, flash memory, etc.). The memory 1618 may include an operating system 1628, one or more data stores 1630, one or more application programs 1632, one or more drivers 1634, and/or services for implementing the features disclosed herein.

The operating system 1628 may support nodes 1602*a*-1602*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1628 may also be a proprietary operating system.

The data stores 1630 may include permanent or transitory data used and/or operated on by the operating system 1628, application programs 1632, or drivers 1634. Examples of such data include web pages, video data, audio data, images, user data, and so on. The information in the data stores 1630 may, in some implementations, be provided over the network(s) 1608 to user devices 1604. In some cases, the data stores 1630 may additionally or alternatively include stored application programs and/or drivers. Alternatively or additionally, the data stores 1630 may store standard and/or proprietary software libraries, and/or standard and/or proprietary application user interface (API) libraries. Information stored in the data stores 1630 may be machine-readable object code, source code, interpreted code, or intermediate code.

The drivers 1634 include programs that may provide communication between components in a node. For example, some drivers 1634 may provide communication between the operating system 1628 and additional storage 1622, network device 1624, and/or I/O device 1626. Alternatively or additionally, some drivers 1634 may provide communication between application programs 1632 and the operating system 1628, and/or application programs 1632 and peripheral devices accessible to the service provider computer. In many cases, the drivers 1634 may include drivers that provide well-understood functionality (e.g., printer drivers, display drivers, hard disk drivers, Solid State Device drivers). In other cases, the drivers 1634 may provide proprietary or specialized functionality.

The service provider computer(s) or servers may also include additional storage 1622, which may include removable storage and/or non-removable storage. The additional storage 1622 may include magnetic storage, optical disks, solid state disks, flash memory, and/or tape storage. The additional storage 1622 may be housed in the same chassis as the node(s) 1602a-1602h or may be in an external enclosure. The memory 1618 and/or additional storage 1622 and their associated computer-readable media may provide non-volatile storage of computer-readable instructions, data structures, program modules, and other data for the computing devices. In some implementations, the memory 1618 may include multiple different types of memory, such as SRAM, DRAM, or ROM.

The memory 1618 and the additional storage 1622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1618 and the additional storage 1622 are examples of computer storage media. Additional types of computer storage media that may be present in the node(s) 1602a-1602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1602a-1602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1602a-1602h may also include I/O device(s) 1626, such as a keyboard, a mouse, a pen, a voice input device, a touch input device, a display, speakers, a printer, and the like. The node(s) 1602a-1602h may also include one or more communication channels 1636. A communication channel 1636 may provide a medium over which the various components of the node(s) 1602a-1602h can communicate. The communication channel or channels 1636 may take the form of a bus, a ring, a switching fabric, or a network.

The node(s) 1602a-1602h may also contain network device(s) 1626 that allow the node(s) 1602a-1602h to communicate with a stored database, another computing device or server, user terminals and/or other devices on the network(s) 1600. The network device(s) 1624 of FIG. 16 may include similar components discussed with reference to the network device 1500 of FIG. 15.

In some implementations, the network device 1626 is a peripheral device, such as a PCI-based device. In these implementations, the network device 1626 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1508 may implement NVMe, and the network device 1626 may be connected to a computing system using a PCIe interface.

A PCI-based device may include one or more functions. A "function" describes operations that may be provided by the network device 1626. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1626 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 15, FIG. 16, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
   a label switching (LS) header processing circuit configured to select, using an LS lookup table and an LS header in a packet, a first operation for the packet; and
   an Internet Protocol (IP) header processing circuit configured to perform an IP lookup on an IP header in the packet, using an IP lookup table, to select a second operation for the packet,
   wherein the LS header processing circuit and the IP header processing circuit are operable to operate sequentially on a same packet and concurrently on different packets in a pipeline; and
   wherein each of the LS header processing circuit and the IP header processing circuit is operable to be bypassed based on an outermost header of the packet.

2. The apparatus of claim 1, wherein the first operation includes:
   replacing an existing LS label in the LS header; or
   terminating a current LS tunnel.

3. The apparatus of claim 1, wherein the second operation includes:
   forwarding the packet to an IP router; or
   initiating an LS tunnel or an IP tunnel.

4. The apparatus of claim 1, wherein:
   the outermost header of the packet is the IP header; and
   the LS header processing circuit is operable to be bypassed when the outermost header of the packet is the IP header.

5. The apparatus of claim 1, wherein:
   the outermost header of the packet is the LS header;
   the first operation includes terminating a current LS tunnel;
   a next header of the packet is the IP header; and
   the second operation includes forwarding the packet to an IP router.

6. The apparatus of claim 1, further comprising:
   an LS outer label determination circuit configured to determine a new LS label for the packet,
   wherein the LS outer label determination circuit is operable to be bypassed based on the first operation or the second operation.

7. The apparatus of claim 6, wherein:
   the first operation includes replacing an existing LS label in the LS header;
   the IP header processing circuit is operable to be bypassed when the first operation includes replacing the existing LS label in the LS header; and the LS outer label determination circuit is operable to determine the new LS label for the packet to replace the existing LS label.

8. The apparatus of claim 6, further comprising:
a tunnel initiation circuit configured to initiate LS tunnels or IP tunnels, wherein the tunnel initiation circuit is operable to be bypassed based on the first operation or the second operation.

9. The apparatus of claim 8, wherein:
the second operation includes initiating a new LS tunnel for the packet;
the tunnel initiation circuit is operable to initiate the new LS tunnel and determine a first LS label for the packet; and
the LS outer label determination circuit is operable to:
determine a second LS label as the new LS label for the packet; and
add the second LS label on top of the first LS label in an LS label stack for the packet.

10. The apparatus of claim 8, wherein:
the first operation includes terminating an existing LS tunnel for the packet such that the IP header becomes the outermost header of the packet;
the second operation includes initiating a new LS tunnel for the packet;
the tunnel initiation circuit is operable to initiate the new LS tunnel and determine a first LS label for the packet; and
the LS outer label determination circuit is configured to:
determine a second LS label as the new LS label for the packet; and
add the second LS label on top of the first LS label in an LS label stack for the packet.

11. The apparatus of claim 1, further comprising:
an IP router configured to determine a next hope for the packet,
wherein the IP router is operable to be bypassed based on the first operation or the second operation.

12. The apparatus of claim 1, wherein:
the LS lookup table includes a plurality of entries, each entry including a virtual routing and forwarding identifier (VRFID); and
the IP lookup table is selected using a VRFID identified for the packet based on the LS header.

13. The apparatus of claim 1, wherein the LS header in the packet is a multiprotocol label switching (MPLS) header.

14. The apparatus of claim 1, wherein the apparatus is one of an application-specific integrated circuit (ASIC), a field-programmable gate array (FPGA), a system-on-chip (SoC), a system-in-package (SiP), and a portion of an ASIC, FPGA, SoC, or SiP.

15. A computer-implemented method for processing packets by a pipeline circuit, the method comprising:
receiving a packet including a label switching (LS) header and an Internet Protocol (IP) header;
determining an outermost header of the packet;
based upon the determination of the outermost header of the packet:
selecting, in response to determining that the outermost header of the packet is the LS header, by a label switching header processing circuit of the pipeline circuit, a first operation for the packet using an LS lookup table based on the LS header; or
selecting, in response to determining that the outermost header of the packet is the IP header, by an Internet Protocol header processing circuit of the pipeline circuit, a second operation for the packet using an IP lookup table based on the IP header; and
configuring, based on the selected first operation or second operation, the pipeline circuit to further process the packet by the Internet Protocol header processing circuit or other circuits of the pipeline circuit.

16. The computer-implemented method of claim 15, wherein:
the first operation includes replacing an existing LS label in the LS header; and
configuring the pipeline circuit includes:
bypassing the Internet Protocol header processing circuit; and
configuring an LS outer label determination circuit to determine a new LS label for the packet to replace the existing LS label.

17. The computer-implemented method of claim 15, wherein:
the first operation includes terminating an existing LS tunnel for the packet; and
configuring the pipeline circuit includes:
configuring the Internet Protocol header processing circuit to select the second operation based on the IP header.

18. The computer-implemented method of claim 17, wherein the second operation includes:
forwarding the packet to an IP router; or
initiating, by a tunnel initiation circuit, a new LS tunnel or a new IP tunnel.

19. The computer-implemented method of claim 15, wherein:
the outermost header of the packet is the IP header; and
the second operation includes:
forwarding the packet to an IP router; or
initiating, by a tunnel initiation circuit, a new LS tunnel or a new IP tunnel.

20. The computer-implemented method of claim 15, wherein:
each of the LS header and the IP header includes a time-to-live (TTL) value; and
the computer-implemented method further includes determining that the TTL value in the LS header or the IP header is greater than a threshold value.

* * * * *

UNITED STATES PATENT AND TRADEMARK OFFICE
CERTIFICATE OF CORRECTION

PATENT NO. : 10,389,632 B1
APPLICATION NO. : 16/035508
DATED : August 20, 2019
INVENTOR(S) : Kari Ann O'Brien, Thomas A. Volpe and Bijendra Singh Page 1 of 1

It is certified that error appears in the above-identified patent and that said Letters Patent is hereby corrected as shown below:

In the Claims

Column 27, Line 35, Claim 11:
Delete: "an IP router configured to determine a next hope for the"
Insert: -- an IP router configured to determine a next hop for the --

Signed and Sealed this
Fifteenth Day of October, 2019

Andrei Iancu
*Director of the United States Patent and Trademark Office*